(12) United States Patent
Pan

(10) Patent No.: US 12,185,107 B2
(45) Date of Patent: Dec. 31, 2024

(54) METHOD AND APPARATUS FOR ENHANCING SECURITY MECHANISM IN UNICAST MODE SIDELINK COMMUNICATION IN A WIRELESS COMMUNICATION SYSTEM

(71) Applicant: ASUS Technology Licensing Inc., Taipei (TW)

(72) Inventor: Li-Te Pan, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/399,138

(22) Filed: Dec. 28, 2023

(65) Prior Publication Data

US 2024/0381090 A1 Nov. 14, 2024

Related U.S. Application Data

(60) Provisional application No. 63/465,611, filed on May 11, 2023.

(51) Int. Cl.
| | |
|---|---|
| *H04W 76/14* | (2018.01) |
| *H04W 12/02* | (2009.01) |
| *H04W 12/0433* | (2021.01) |
| *H04W 12/08* | (2021.01) |
| *H04W 76/11* | (2018.01) |
| *H04W 92/18* | (2009.01) |

(52) U.S. Cl.
CPC ........... *H04W 12/08* (2013.01); *H04W 12/02* (2013.01); *H04W 12/0433* (2021.01); *H04W 76/11* (2018.02); *H04W 76/14* (2018.02); *H04W 92/18* (2013.01)

(58) Field of Classification Search
CPC ..... H04W 12/08; H04W 76/14; H04W 76/11; H04W 12/0433; H04W 12/02; H04W 92/18
USPC .............................................................. 726/4
See application file for complete search history.

(56) References Cited

U.S. PATENT DOCUMENTS

| | | | |
|---|---|---|---|
| 11,057,950 B1* | 7/2021 | Pan | H04W 76/11 |
| 11,259,350 B1* | 2/2022 | Pan | H04W 88/04 |
| 11,627,616 B2* | 4/2023 | Pan | H04L 1/1607 370/328 |
| 11,638,132 B2* | 4/2023 | Perras | H04W 4/40 455/411 |
| 2021/0211870 A1* | 7/2021 | Perras | H04W 4/70 |
| 2021/0298100 A1* | 9/2021 | Pan | H04L 1/1607 |
| 2022/0007445 A1* | 1/2022 | Pan | H04W 40/22 |
| 2022/0060886 A1* | 2/2022 | Zhang | H04L 69/22 |
| 2022/0095398 A1* | 3/2022 | Pan | H04W 76/14 |
| 2022/0174783 A1* | 6/2022 | Chen | H04W 12/02 |
| 2022/0225091 A1* | 7/2022 | Nassar | H04L 9/3213 |
| 2023/0109855 A1* | 4/2023 | Chun | H04W 4/42 370/329 |
| 2023/0209619 A1* | 6/2023 | Pan | H04L 1/1607 370/328 |

(Continued)

*Primary Examiner* — April G Gonzales
(74) *Attorney, Agent, or Firm* — Cooper Legal Group LLC

(57) ABSTRACT

A method and device for a second User Equipment (UE). In one embodiment, the second UE establishes a unicast link with a first UE. Furthermore, the second UE is not allowed to initiate a direct link identifier update procedure or a direct link modification procedure if at least the second UE is performing any direct link re-keying procedure triggered by the first UE for the unicast link.

20 Claims, 15 Drawing Sheets

(56) References Cited

U.S. PATENT DOCUMENTS

| 2023/0283998 A1* | 9/2023 | Perras | H04W 12/61 |
| | | | 455/411 |
| 2024/0030992 A1* | 1/2024 | Guo | H04W 4/40 |

* cited by examiner

METHOD AND APPARATUS FOR ENHANCING SECURITY MECHANISM IN UNICAST MODE SIDELINK COMMUNICATION IN A WIRELESS COMMUNICATION SYSTEM

CROSS-REFERENCE TO RELATED APPLICATIONS

The present Application claims the benefit of U.S. Provisional Patent Application Ser. No. 63/465,611 filed on May 11, 2023, the entire disclosure of which is incorporated herein in its entirety by reference.

FIELD

This disclosure generally relates to wireless communication networks, and more particularly, to a method and apparatus for enhancing security mechanism in unicast mode sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a second User Equipment (UE). In one embodiment, the second UE establishes a unicast link with a first UE. Furthermore, the second UE is not allowed to initiate a direct link identifier update procedure or a direct link modification procedure if at least the second UE is performing any direct link re-keying procedure triggered by the first UE for the unicast link.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V17.5.0, "Proximity based Services (ProSe) in the 5G System (5GS) (Release 17)"; and TS 24.554 V17.4.0, "Proximity-services (ProSe) in 5G System (5GS) protocol aspects; Stage 3 (Release 17)". The standards and documents listed above are hereby expressly incorporated by reference in their entirety.

Figure 1:
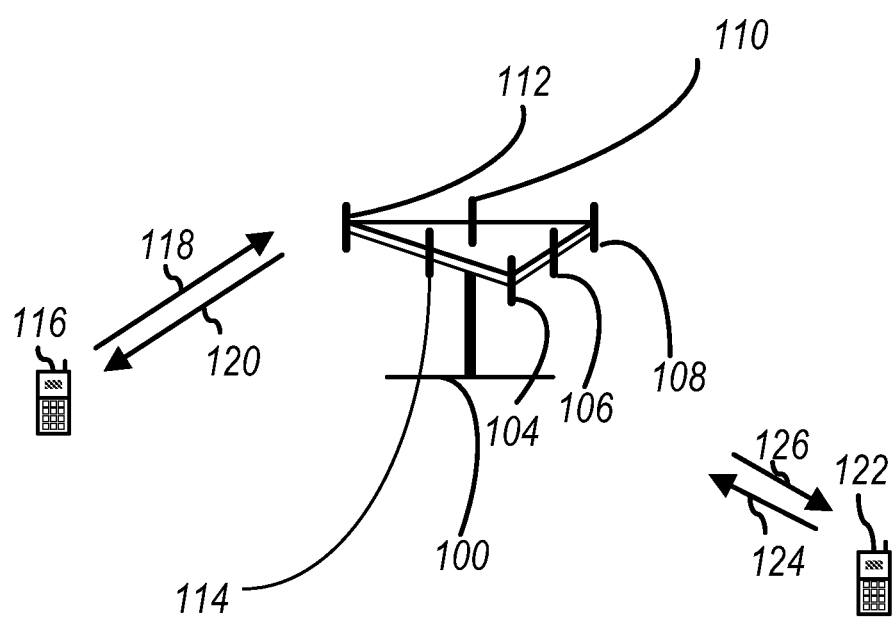
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
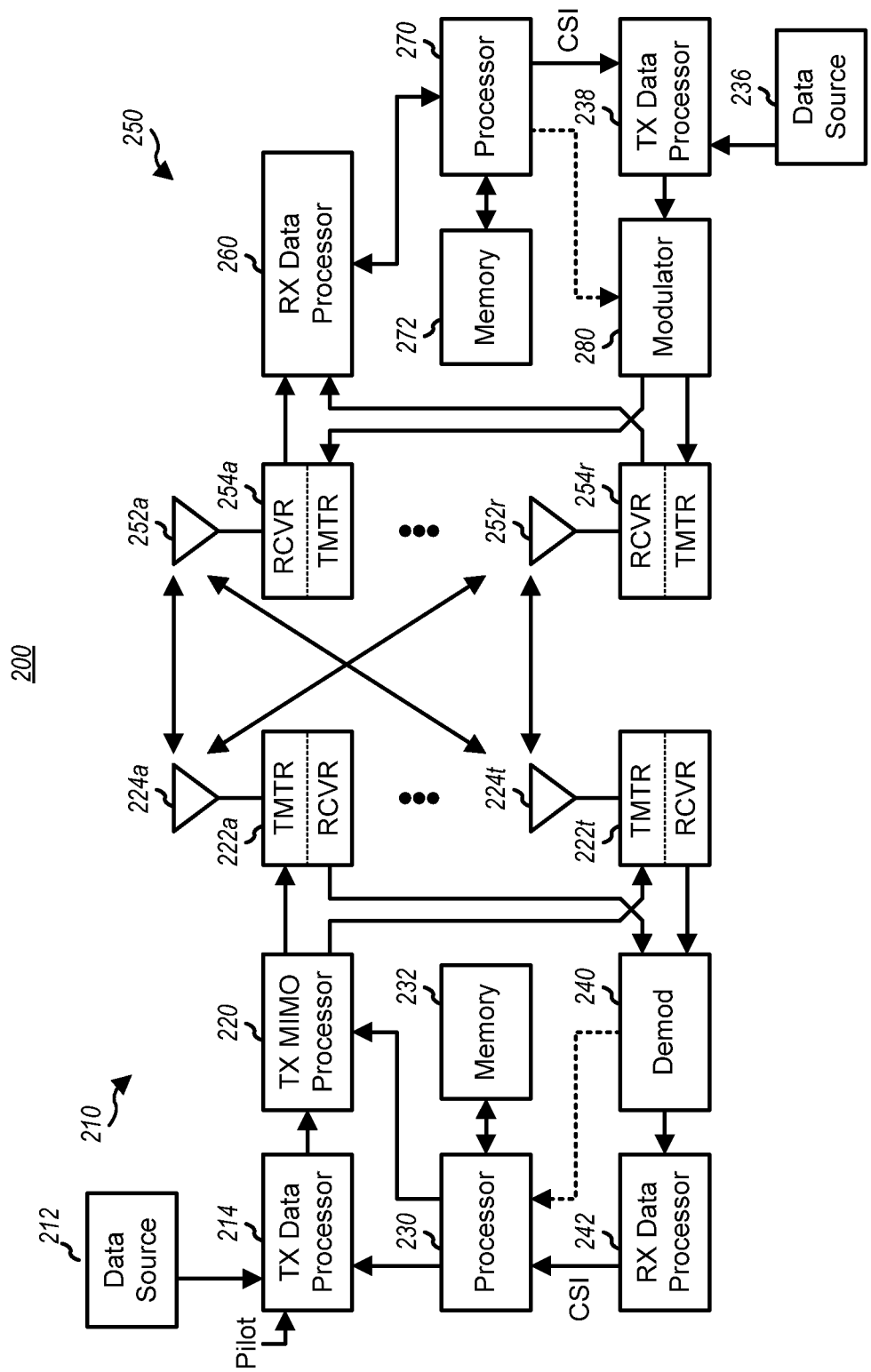
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
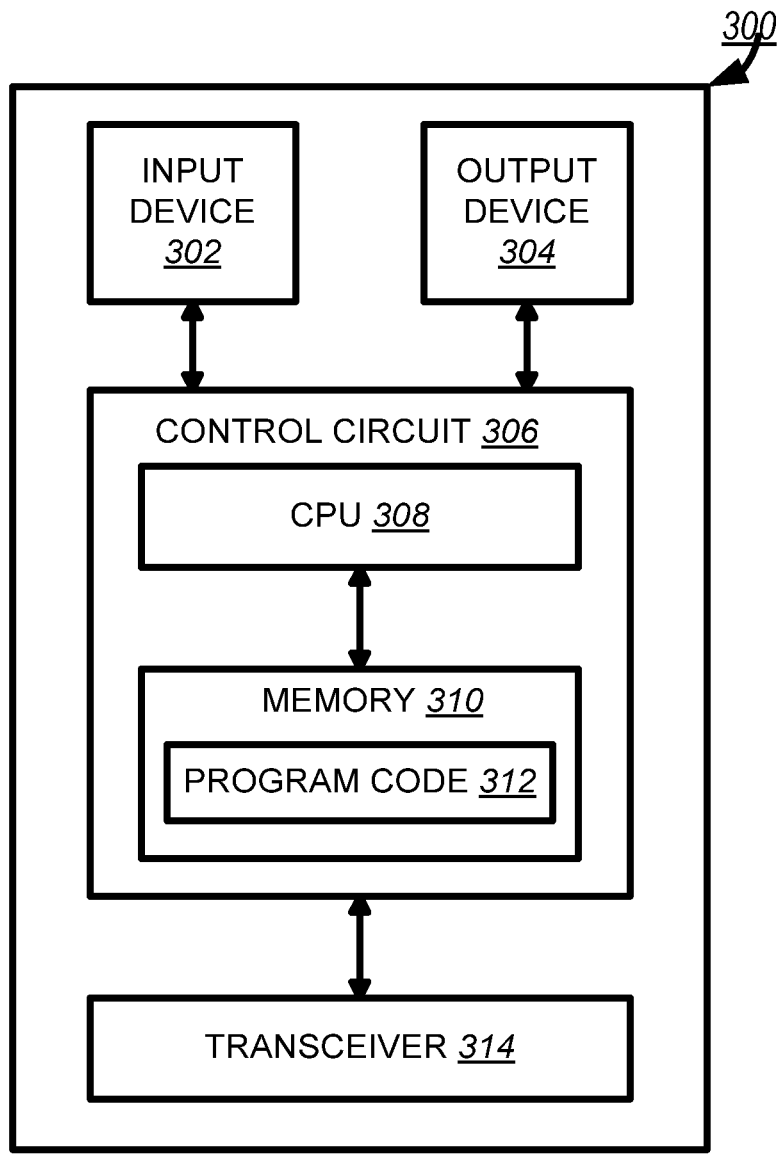
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
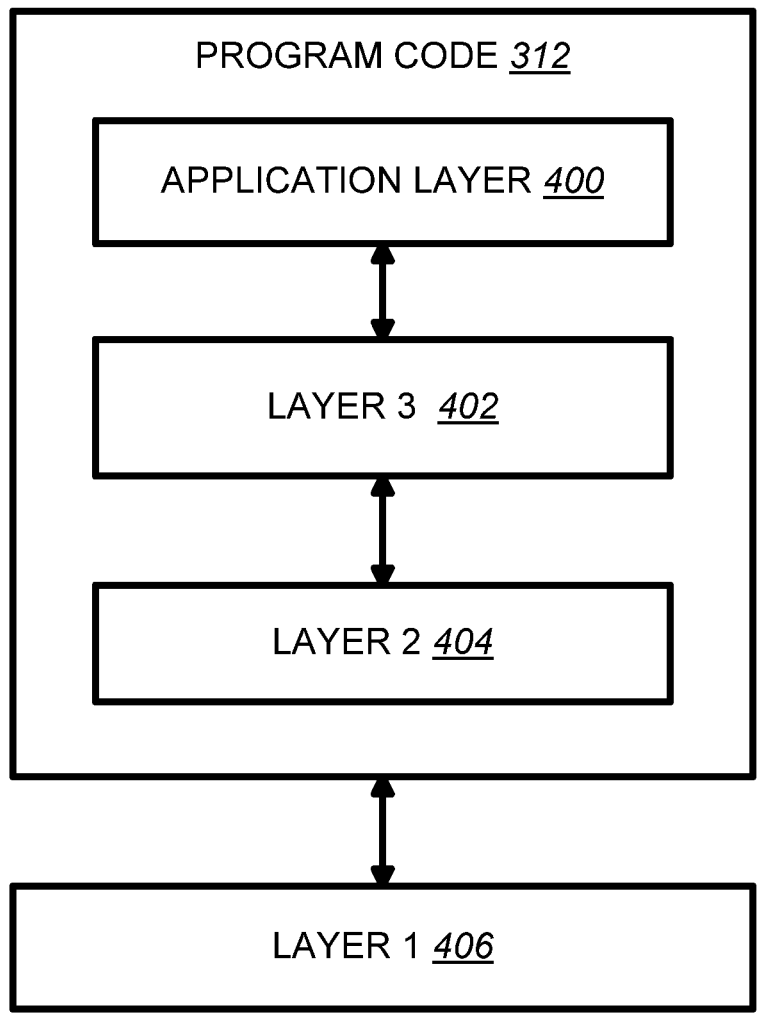
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 introduced the following:

6.4.3.1 Layer-2 Link Establishment Over PC5 Reference Point

To perform unicast mode of ProSe Direct communication over PC5 reference point, the UE is configured with the related information as described in clause 5.1.3.

Figure 6:
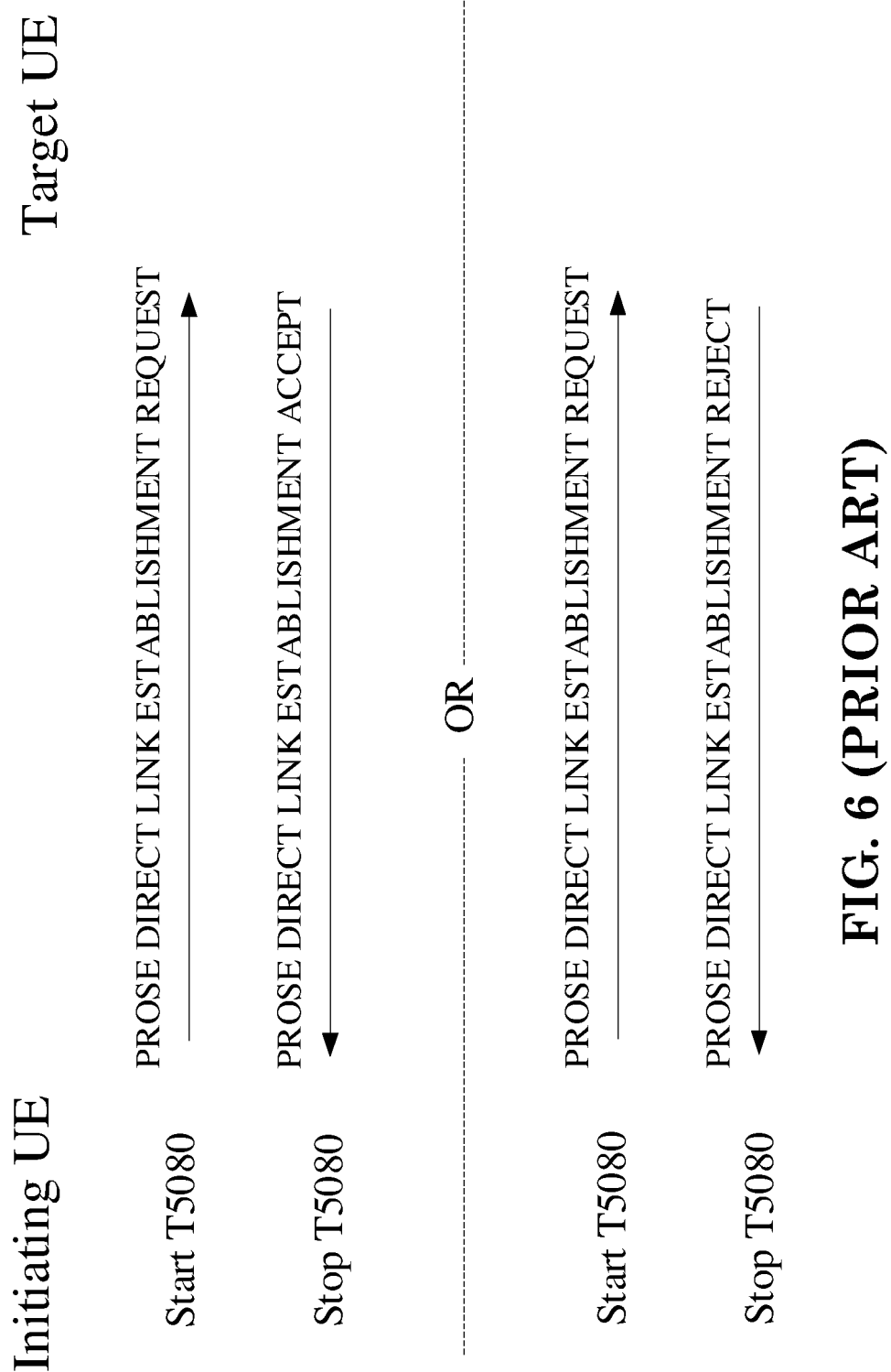
FIG. 6 is a reproduction of FIG. 7.2.2.2.1 of 3GPP TS 24.554 V17.4.0.

FIG. 6.4.3.1-1 shows the layer-2 link establishment procedure for the unicast mode of ProSe Direct communication over PC5 reference point.

Figure 5:
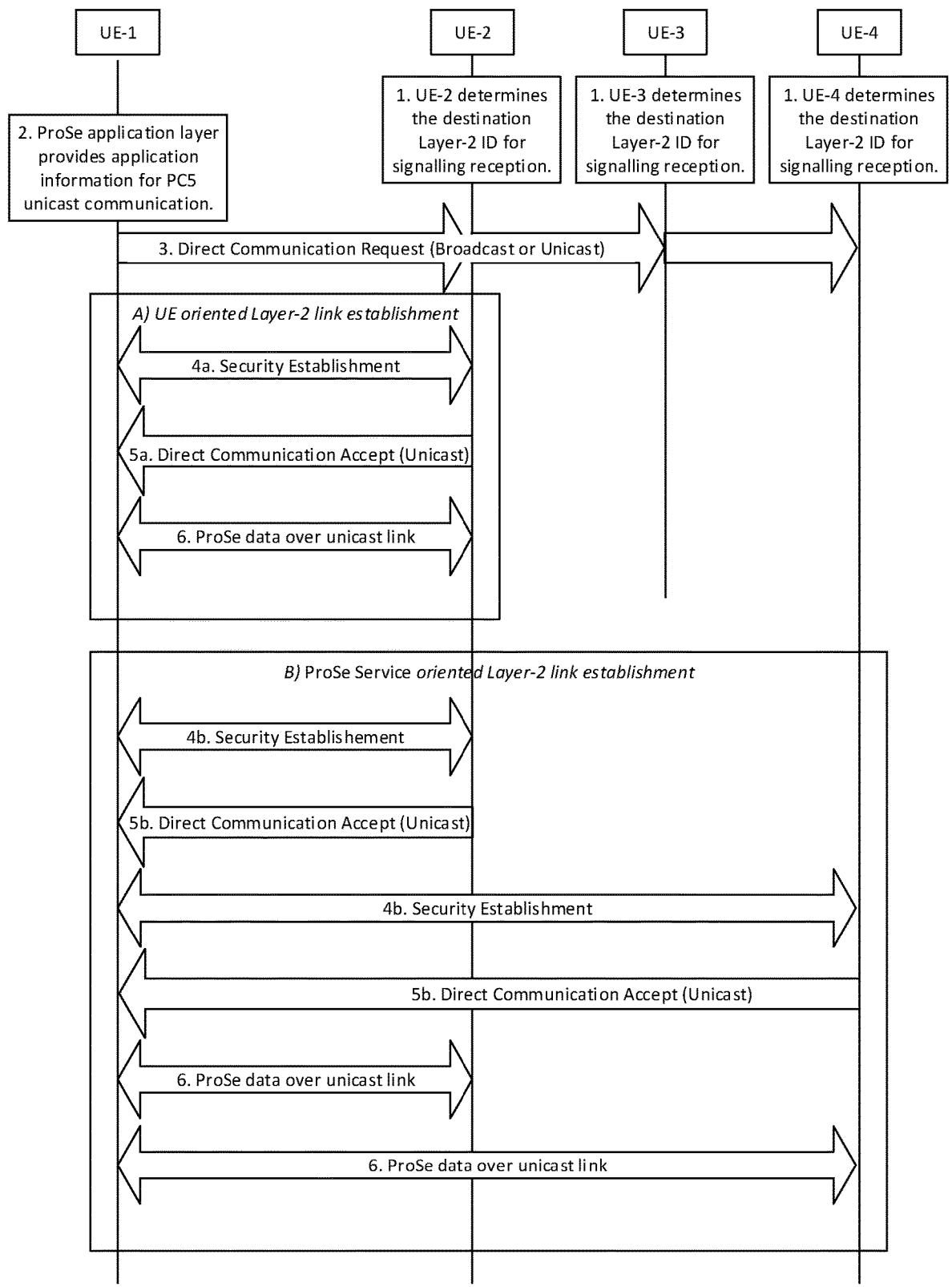
FIG. 5 is a reproduction of FIG. 6.4.3.1-1 of 3GPP TS 23.304 V17.5.0.

[FIG. 6.4.3.1-1 of 3GPP TS 23.304 V17.5.0, Entitled "Layer-2 Link Establishment Procedure", is Reproduced as FIG. 5]

1. The UE(s) determine the destination Layer-2 ID for signalling reception for PC5 unicast link establishment as specified in clause 5.8.2.4.

2. The ProSe application layer in UE-1 provides application information for PC5 unicast communication. The application information includes the ProSe Service Info, UE's Application Layer ID. The target UE's Application Layer ID may be included in the application information.

The ProSe application layer in UE-1 may provide ProSe Application Requirements for this unicast communication. UE-1 determines the PC5 QoS parameters and PFI as specified in clause 5.6.1.

If UE-1 decides to reuse the existing PC5 unicast link as specified in clause 5.3.4, the UE triggers the Layer-2 link modification procedure as specified in clause 6.4.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the ProSe application layer provided the target UE's Application Layer ID in step 2, the following information is included:

Target User Info: the target UE's Application Layer ID (i.e. UE-2's Application Layer ID).

ProSe Service Info: the information about the ProSe identifier(s) requesting Layer-2 link establishment.

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

A default PC5 DRX configuration may be used for transmitting and receiving of this message (see TS 38.300 [12]).

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced ProSe Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:

IP Address Configuration: For IP communication, IP address configuration is required for this link and indicates one of the following values:

"DHCPv4 server" if only IPv4 address allocation mechanism is supported by the initiating UE, i.e., acting as a DHCPv4 server; or "IPv6 Router" if only IPv6 address allocation mechanism is supported by the initiating UE, i.e., acting as an IPv6 Router; or "DHCPv4 server & IPv6 Router" if both IPv4 and IPv6 address allocation mechanism are supported by the initiating UE; or "address allocation not supported" if neither IPv4 nor IPv6 address allocation mechanism is supported by the initiating UE.

Link-Local IPv6 Address: a link-local IPv6 address formed locally based on RFC 4862 [17] if UE-1 does not support the IPv6 IP address allocation mechanism, i.e. the IP Address Configuration indicates "address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.) and optionally the associated ProSe identifier(s).

Optional PC5 QoS Rule(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.4.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1

(i.e. PQI and conditionally other parameters such as MFBR/GFBR, etc.) and optionally the associated ProSe identifiers(s).

Optional PC5 QoS Rule(s).

If IP communication is used:
  IP Address Configuration: For IP communication, IP address configuration is required for this link and indicates one of the following values:
    "DHCPv4 server" if only IPv4 address allocation mechanism is supported by the target UE, i.e., acting as a DHCPv4 server; or
    "IPv6 Router" if only IPv6 address allocation mechanism is supported by the target UE, i.e., acting as an IPv6 Router; or
    "DHCPv4 server & IPv6 Router" if both IPv4 and IPv6 address allocation mechanism are supported by the target UE; or
    "address allocation not supported" if neither IPv4 nor IPv6 address allocation mechanism is supported by the target UE.
  Link-Local IPv6 Address: a link-local IPv6 address formed locally based on RFC 4862 [17] if the target UE does not support the IPv6 IP address allocation mechanism, i.e. the IP Address Configuration indicates "address allocation not supported", and UE-1 included a link-local IPv6 address in the Direct Communication Request message. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Two UEs may negotiate the PC5 DRX configuration in the AS layer, and the PC5 DRX parameter values can be configured per pair of source and destination Layer-2 IDs in the AS layer.

6. ProSe data is transmitted over the established unicast link as below: The PC5 Link Identifier and PFI are provided to the AS layer, together with the ProSe data. Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

3GPP TS 24.554 introduced the following:

7.2.2 5G ProSe Direct Link Establishment Procedure 7.2.2.1 General

Depending on the type of the 5G ProSe direct link establishment procedure (i.e., UE oriented layer-2 link establishment or ProSe service oriented layer-2 link establishment in 3GPP TS 23.304 [2]), the 5G ProSe direct link establishment procedure is used to establish a 5G ProSe direct link between two UEs or to establish multiple 5G ProSe direct links between the UE and multiple target UEs. The UE sending the request message is called the "initiating UE" and the other UE is called the "target UE". If the request message does not indicate the specific target UE (i.e., target user info is not included in the request message) and multiple target UEs are interested in the ProSe application(s) indicated in the request message, then the initiating UE shall handle corresponding response messages received from those target UEs. The maximum number of 5G ProSe direct links established in a UE at a time shall not exceed an implementation-specific maximum number of established 5G ProSe direct links.

NOTE 1: The recommended maximum number of established 5G ProSe direct links is 8.

When the 5G ProSe direct link establishment procedure for a 5G ProSe layer-3 remote UE completes successfully and if there is a PDU session established for relaying the traffic of the 5G ProSe remote UE, the 5G ProSe layer-3 UE-to-network relay UE shall perform the remote UE report procedure as specified in 3GPP TS 24.501 [11].

NOTE 2: A single PC5 unicast link is established between a 5G ProSe layer-2 UE-to-network relay UE and a 5G ProSe layer-2 remote UE for supporting PDU sessions of the 5G ProSe layer-2 remote UE, as specified in 3GPP TS 38.300 [21].

7.2.2.2 5G ProSe Direct Link Establishment Procedure Initiation by Initiating UE The initiating UE shall meet the following pre-conditions before initiating this procedure:
  a) a request from upper layers to transmit the packet for ProSe application over PC5 or a request from lower layers to trigger ProSe direct link establishment;
  b) the communication mode is unicast mode (e.g., pre-configured as specified in clause 5.2.4 or indicated by upper layers);
  c) the link layer identifier for the initiating UE (i.e., layer-2 ID used for unicast communication) is available (e.g., pre-configured or self-assigned) and is not being used by other existing 5G ProSe direct links within the initiating UE;
  d) the link layer identifier for the destination UE (i.e., the unicast layer-2 ID of the target UE or the broadcast layer-2 ID) is available to the initiating UE (e.g., pre-configured, obtained as specified in clause 5.2, known via prior ProSe direct communication or indicated by lower layers);
  NOTE 1: In the case where different ProSe applications are mapped to distinct default destination layer-2 IDs, when the initiating UE intends to establish a single unicast link that can be used for more than one ProSe identifiers, the UE can select any of the default destination layer-2 ID for unicast initial signalling.
  e) the initiating UE is either authorised for 5G ProSe direct communication over PC5 in NR-PC5 in the serving PLMN, has a valid authorization for 5G ProSe direct communication over PC5 in NR-PC5 when not served by NG-RAN, or is authorized to use a 5G ProSe UE-to-network relay UE. The UE considers that it is not served by NG-RAN if the following conditions are met:
1) not served by NG-RAN for ProSe direct communication over PC5;
2) in limited service state as specified in 3GPP TS 23.122 [14], if the reason for the UE being in limited service state is one of the following;
   i) the UE is unable to find a suitable cell in the selected PLMN as specified in 3GPP TS 38.304 [15];
   ii) the UE received a REGISTRATION REJECT message or a SERVICE REJECT message with the 5GMM cause #11 "PLMN not allowed" as specified in 3GPP TS 24.501 [11]; or
   iii) the UE received a REGISTRATION REJECT message or a SERVICE REJECT message with the 5GMM cause #7 "5GS services not allowed" as specified in 3GPP TS 24.501 [11]; or
3) in limited service state as specified in 3GPP TS 23.122 [14] for reasons other than i), ii) or iii) above and located in a geographical area for which the UE is provisioned with "non-operator managed" radio parameters as specified in clause 5.2;
f) there is no existing 5G ProSe direct link for the pair of peer application layer IDs, or there is an existing 5G ProSe direct link for the pair of peer application layer IDs and:
   1) the network layer protocol of the existing 5G ProSe direct link is not identical to the network layer protocol required by the upper layer in the initiating UE for this ProSe application;
   2) the security policy (either signalling security policy or user plane security policy) corresponding to the ProSe identifier is not compatible with the security policy of the existing 5G ProSe direct link; or
   3) in case of the 5G ProSe direct link establishment procedure is for direct communication between the 5G ProSe layer-3 remote UE and the 5G ProSe layer-3 UE-to-network relay UE, the existing 5G ProSe direct link for the peer UE is established with a different RSC or established not for direct communication between the 5G ProSe layer-3 remote UE and the 5G ProSe layer-3 UE-to-network relay UE; or
   4) in case of the 5G ProSe direct link establishment procedure is for direct communication between the 5G ProSe layer-2 remote UE and the 5G ProSe layer-2 UE-to-network relay UE, the existing 5G ProSe direct link for the peer UE is established not for direct communication between the 5G ProSe layer-2 remote UE and the 5G ProSe layer-2 UE-to-network relay UE;
g) the number of established 5G ProSe direct links is less than the implementation-specific maximum number of established 5G ProSe direct links allowed in the UE at a time; and
h) timer T5088 is not associated with the link layer identifier for the destination UE or timer T5088 associated with the link layer identifier for the destination UE has already expired or stopped.

After receiving the service data or request from the upper layers, the initiating UE shall derive the PC5 QoS parameters and assign the PQFI(s) for the PC5 QoS flows(s) to be established as specified in clause 7.2.7.

If the 5G ProSe direct link establishment procedure is for direct communication between the 5G ProSe remote UE and the 5G ProSe UE-to-network relay UE, then the UE shall apply the DUCK or DUSK with the associated encrypted bitmask used for UE-to-network relay discovery along with the UTC-based counter for encrypting:
   a) the relay service code; and
   b) the UP-PRUK ID or CP-PRUK ID, if available,
as specified in clause 6.3.5.2 of 3GPP TS 33.503 [34], and the UE shall use the security protected relay service code and the security protected UP-PRUK ID or security protected CP-PRUK ID for creating a PROSE DIRECT LINK ESTABLISHMENT REQUEST message.

NOTE 2: If the UE is neither configured with DUCK nor DUSK, the relay service code and the UP-PRUK ID or CP-PRUK ID are not encrypted.

In order to initiate the 5G ProSe direct link establishment procedure, the initiating UE shall create a PROSE DIRECT LINK ESTABLISHMENT REQUEST message. The initiating UE:
   a) shall include the source user info set to the initiating UE's application layer ID received from upper layers;
   b) shall include the ProSe identifier(s) received from upper layer if the 5G ProSe direct link establishment procedure is not for 5G ProSe direct communication between the 5G ProSe remote UE and the 5G ProSe UE-to-network relay UE;
   c) shall include the target user info set to the target UE's application layer ID if received from upper layers or if known based on the unicast layer-2 ID of target UE (i.e. destination layer-2 ID) as described in clause 5.8.2.4 of 3GPP TS 23.304 [3], or to the user info ID of the 5G ProSe UE-to-network relay UE obtained during the 5G ProSe UE-to-network relay discovery procedure;
   d) if the 5G ProSe direct link is not for direct communication between the 5G ProSe remote UE and the 5G ProSe UE-to-network relay UE:
      1) shall include the key establishment information container if the UE PC5 unicast signalling integrity protection policy is set to "Signalling integrity protection required" or "Signalling integrity protection preferred" and may include the key establishment information container if the UE PC5 unicast signalling integrity protection policy is set to "Signalling integrity protection not needed";
   NOTE 3: The key establishment information container is provided by upper layers.
   e) shall include:
      1) a Nonce_1, if the direct communication is not between the 5G ProSe remote UE and the 5G ProSe UE-to-network relay UE, or if the direct communication is between the 5G ProSe remote UE and the 5G ProSe UE-to-network relay UE and the security procedure over control plane is used as specified in 3GPP TS 33.503 [34]; or
      2) a $K_{NRP}$ freshness parameter 1, if the direct communication is between the 5G ProSe remote UE and the 5G ProSe UE-to-network relay UE and the security procedure over user plane is used as specified in 3GPP TS 33.503 [34];
      set to the 128-bit nonce value generated by the initiating UE for the purpose of session key establishment over this 5G ProSe direct link if the UE PC5 unicast signalling integrity protection policy is set to "Signalling integrity protection required" or "Signalling integrity protection preferred";

NOTE 4: The Nonce_1 IE in the PROSE DIRECT LINK ESTABLISHMENT REQUEST message is used to hold the value of Nonce_1 or $K_{NRP}$ freshness parameter 1.

f) shall include its UE security capabilities indicating the list of algorithms that the initiating UE supports for the security establishment of this 5G ProSe direct link;

g) shall include the MSB of $K_{NRP}$-sess ID chosen by the initiating UE as specified in 3GPP TS 33.503 [34] if the UE PC5 unicast signalling integrity protection policy is set to "Signalling integrity protection required" or "Signalling integrity protection preferred";

NOTE 5: If the direct communication is not between the 5G ProSe remote UE and the 5G ProSe UE-to-network relay UE, the $K_{NRP\text{-}sess}$ ID holds the ID that corresponds to $K_{NRP\text{-}sess}$. If the direct communication is between the 5G ProSe remote UE and the 5G ProSe UE-to-network relay UE, the $K_{NRP\text{-}sess}$ ID holds the ID that corresponds to $K_{NRP\text{-}sess}$ (if security procedure over user plane is used) or $K_{relay\text{-}sess}$ (if security procedure over control plane is used).

h) may include a $K_{NRP}$ ID if the initiating UE has an existing $K_{NRP}$ for the target UE and the direct communication is not between the 5G ProSe remote UE and the 5G ProSe UE-to-network relay UE;

i) shall include its UE PC5 unicast signalling security policy. In the case where the different ProSe applications are mapped to the different PC5 unicast signalling security policies, when the initiating UE intends to establish a single unicast link that can be used for more than one ProSe application, each of the signalling security polices of those ProSe applications shall be compatible, e.g., "Signalling integrity protection not needed" and "Signalling integrity protection required" are not compatible. In case the 5G ProSe direct link establishment procedure is for direct communication between 5G ProSe remote UE and 5G ProSe UE-to-network relay UE, the Signalling integrity protection policy shall be set to "Signalling integrity protection required";

j) shall include the Relay service code IE set to the relay service code of the target relay UE if the 5G ProSe direct link establishment procedure is for direct communication between the 5G ProSe remote UE and the 5G ProSe UE-to-network relay UE;

k) shall include the UTC-based counter LSB set to the four least significant bits of the UTC-based counter if the 5G ProSe direct link establishment procedure is for direct communication between the 5G ProSe remote UE and the 5G ProSe UE-to-network relay UE;

l) shall include the UE identity IE set to the SUCI of the initiating UE if:
  1) the 5G ProSe direct link establishment procedure is for direct communication between the 5G ProSe remote UE and the 5G ProSe UE-to-network relay UE; and
  2) the security for 5G ProSe UE-to-network relay uses the security procedure over control plane and the initiating UE does not have a valid CP-PRUK as specified in 3GPP TS 33.503 [34], or, the security for 5G ProSe UE-to-network relay uses the security procedure over user plane and the initiating UE does not have a valid UP-PRUK as specified in 3GPP TS 33.503 [34];

m) shall include the User security key ID IE set to:
  1) UP-PRUK ID of the initiating UE if:
    i) the 5G ProSe direct link establishment procedure is for direct communication between the 5G ProSe remote UE and the 5G ProSe UE-to-network relay UE;
    ii) the initiating UE has a valid UP-PRUK; and
    iii) the security for 5G ProSe UE-to-network relay uses the security procedure over user plane as specified in 3GPP TS 33.503 [34]; or
  2) CP-PRUK ID of the initiating UE that is associated with the relay service code of the target UE if:
    i) the 5G ProSe direct link establishment procedure is for direct communication between the 5G ProSe remote UE and the 5G ProSe UE-to-network relay UE;
    ii) the initiating UE has a valid CP-PRUK is associated with the relay service code of the target UE; and
    iii) the security for 5G ProSe UE-to-network relay uses the security procedure over control plane as specified in 3GPP TS 33.503 [34];

n) shall include the HPLMN ID of the initiating UE, if the UP-PRUK ID of the initiating UE is included and is not in NAI format (see 3GPP TS 33.503 [34]); and o) shall include the MIC IE set to the calculated MIC value as specified in clause 6.3.5.3 of 3GPP TS 33.503 [34] if the 5G ProSe direct link establishment procedure is for direct communication between the 5G ProSe remote UE and the 5G ProSe UE-to-network relay UE and the UE has the DUIK.

After the PROSE DIRECT LINK ESTABLISHMENT REQUEST message is generated, the initiating UE shall pass this message to the lower layers for transmission along with the source layer-2 ID and destination layer-2 ID as follows:

a) if the 5G ProSe direct communication is in a consequence of 5G ProSe direct discovery as defined in clause 6.2.14, clause 6.2.15, and clause 8.2.1:
  self-assign a source layer-2 ID, and the destination layer-2 ID set to the source layer-2 ID in the received PROSE PC5 DISCOVERY message for discovery procedure; or b) otherwise:
  self-assign a source layer-2 ID, and the destination layer-2 ID set to the destination layer-2 ID used for unicast initial signalling as specified in clause 5.2.4, NOTE 6: The UE implementation ensures that any value of the self-assigned source layer-2 ID in a) and b) is different from any other self-assigned source layer-2 ID(s) in use for 5G ProSe direct discovery as specified in clause 6.2.14, clause 6.2.15 and clause 8.2.1, and is different from any other provisioned destination layer-2 ID(s) as specified in clause 5.2.

NOTE 7: It is possible for the initiating UE to reuse the initiating UE's layer-2 ID used in previous 5G ProSe direct link with the same peer UE.

and start timer T5080.

NOTE 8: A default PC5 DRX configuration is used for transmitting the PROSE DIRECT LINK ESTABLISHMENT REQUEST message as specified in 3GPP TS 38.300 [21].

The UE shall not send a new PROSE DIRECT LINK ESTABLISHMENT REQUEST message to the same target UE identified by the same application layer ID while timer T5080 is running. If the target user info IE is not included in the PROSE DIRECT LINK ESTABLISHMENT REQUEST message (i.e., ProSe application oriented 5G ProSe direct link establishment procedure), the initiating UE shall handle multiple PROSE DIRECT LINK ESTABLISHMENT ACCEPT messages, if any, received from different target UEs for the establishment of multiple 5G ProSe direct links before the expiry of timer T5080.

NOTE 9: In order to ensure successful 5G ProSe direct link establishment, T5080 should be set to a value larger than the sum of T5089 and T5092.

Figure 7:
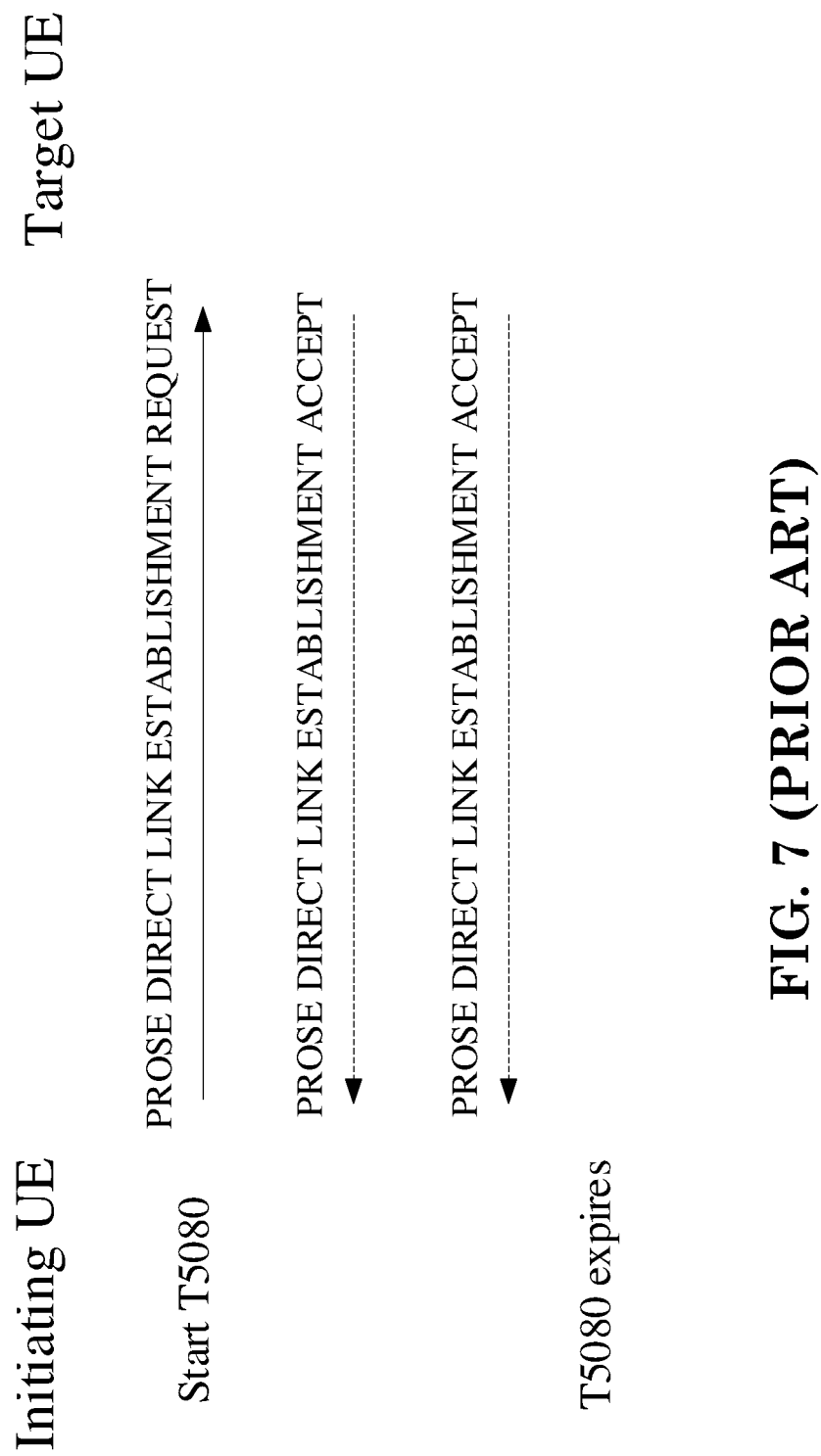
FIG. 7 is a reproduction of FIG. 7.2.2.2.2 of 3GPP TS 24.554 V17.4.0.

[FIG. 7.2.2.2.1 of 3GPP TS 24.554 V17.4.0, Entitled "UE Oriented 5G ProSe Direct Link Establishment Procedure", is Reproduced as FIG. 6]

[FIG. 7.2.2.2.2 of 3GPP TS 24.554 V17.4.0, Entitled "ProSe Service Oriented 5G ProSe Direct Link Establishment Procedure", is Reproduced as FIG. 7]

7.2.2.3 5G ProSe Direct Link Establishment Procedure Accepted by the Target UE

Upon receipt of a PROSE DIRECT LINK ESTABLISHMENT REQUEST message, if the target UE accepts this request, the target UE shall uniquely assign a PC5 link identifier, create a 5G ProSe direct link context.

NOTE 1: A default PC5 DRX configuration is used for receiving the PROSE DIRECT LINK ESTABLISHMENT REQUEST message as specified in 3GPP TS 38.300 [21].

If the PROSE DIRECT LINK ESTABLISHMENT REQUEST message is for 5G ProSe direct communication between the 5G ProSe remote UE and the 5G ProSe UE-to-network relay UE, the target UE shall verify the MIC field in the received PROSE DIRECT LINK ESTABLISHMENT REQUEST with the DUIK, if any, and decrypts the encrypted:
   a) relay service code; and
   b) UP-PRUK ID or CP-PRUK ID, if received,
using the DUCK, or DUSK with the associated encrypted bitmask used for 5G ProSe UE-to-network relay discovery (see clause 6.3.5.2 of 3GPP TS 33.503 [34]) and verifies if the relay service code matches with the one that the target UE has sent during 5G ProSe UE-to-network relay discovery procedure.

NOTE 2: If the UE is neither configured with DUCK nor DUSK, the relay service code and the UP-PRUK ID or CP-PRUK ID are not encrypted.

If the 5G ProSe direct link establishment procedure is not for direct communication between the 5G ProSe remote UE and the 5G ProSe UE-to-network relay UE, the target UE may initiate 5G ProSe direct link authentication procedure as specified in clause 7.2.12 and shall initiate 5G ProSe direct link security mode control procedure as specified in clause 7.2.10.

If the 5G ProSe direct link establishment procedure is for direct communication between the 5G ProSe remote UE and the 5G ProSe UE-to-network relay UE, the target UE shall proceed with either:
   a) the authentication and key agreement procedure as specified in clause 5.5.4 of 3GPP TS 24.501 [11] if the security procedure over control plane as specified in 3GPP TS 33.503 [34] is used; or
   b) the key request procedure as specified in clause 8.2.10.2.4 if the security procedure over user plane as specified in 3GPP TS 33.503 [34] is used;
and shall initiate 5G ProSe direct link security mode control procedure as specified in clause 7.2.10.

The target UE shall set the source layer-2 ID and the destination layer-2 ID as specified in clause 7.2.12 and clause 7.2.10, and store the corresponding source layer-2 ID for unicast communication and the destination layer-2 ID for unicast communication in the 5G ProSe direct link context. If:
   a) the target user info IE is included in the PROSE DIRECT LINK ESTABLISHMENT REQUEST message and this IE includes the target UE's application layer ID; or
   b) the target user info IE is not included in the PROSE DIRECT LINK ESTABLISHMENT REQUEST message and the target UE is interested in the ProSe application(s) identified by the ProSe identifier IE in the PROSE DIRECT LINK ESTABLISHMENT REQUEST message;
then the target UE shall:
   a) if the direct communication is not between the 5G ProSe remote UE and the 5G ProSe UE-to-network relay UE:
      1) identify an existing $K_{NRP}$ based on the $K_{NRP}$ ID included in the PROSE DIRECT LINK ESTABLISHMENT REQUEST message; or
      2) if $K_{NRP}$ ID is not included in the PROSE DIRECT LINK ESTABLISHMENT REQUEST message, the target UE does not have an existing $K_{NRP}$ for the $K_{NRP}$ ID included in PROSE DIRECT LINK ESTABLISHMENT REQUEST message or the target UE wishes to derive a new $K_{NRP}$, derive a new $K_{NRP}$. This may require performing one or more 5G ProSe direct link authentication procedures as specified in clause 7.2.12;
   b) if the direct communication is between the 5G ProSe remote UE and the 5G ProSe UE-to-network relay UE and the security procedure over control plane as specified in 3GPP TS 33.503 [34] is used, request a new $K_{NR}\_ProSe$ according to the security procedure over user plane as specified in 3GPP TS 33.503 [34]; or
   c) if the direct communication is between the 5G ProSe remote UE and the 5G ProSe UE-to-network relay UE and the security procedure over user plane as specified in 3GPP TS 33.503 [34] is used, request a new $K_{NRP}$ according to the security procedure over user plane.

NOTE 3: How many times the 5G ProSe direct link authentication procedure needs to be performed to derive a new $K_{NRP}$ depends on the authentication method used.

After an existing $K_{NRP}$ was identified or a new $K_{NRP}$ was derived, or after a new $K_{NRP}$ or $K_{NR}\_ProSe$ is received, the target UE shall initiate a 5G ProSe direct link security mode control procedure as specified in clause 7.2.10.

Upon successful completion of the 5G ProSe direct link security mode control procedure, in order to determine whether the PROSE DIRECT LINK ESTABLISHMENT REQUEST message can be accepted or not, in case of IP communication, the target UE checks whether there is at least one common IP address configuration option supported by both the initiating UE and the target UE.

Before sending the PROSE DIRECT LINK ESTABLISHMENT ACCEPT message to the 5G ProSe remote UE, the target UE acting as a 5G ProSe layer-3 UE-to-network relay UE initiates the UE requested PDU session establishment procedure as specified in 3GPP TS 24.501 [11] if:
   1) the PDU session for relaying the service associated with the RSC has not been established yet; or
   2) the PDU session for relaying the service associated with the RSC has been established but the PDU session type is Unstructured.

If the target UE accepts the 5G ProSe direct link establishment procedure, the target UE shall create a PROSE DIRECT LINK ESTABLISHMENT ACCEPT message. The target UE:

a) shall include the source user info set to the target UE's application layer ID received from upper layers;
b) shall include PQFI(s), the corresponding PC5 QoS parameters and optionally the ProSe identifier(s) that the target UE accepts, if the target UE is not acting as a 5G ProSe layer-2 UE-to-network relay UE;
c) may include the PC5 QoS rule(s) if the target UE is not acting as a 5G ProSe layer-2 UE-to-network relay UE;
d) shall include an IP address configuration IE set to one of the following values if IP communication is used and the target UE is not acting as a 5G ProSe layer-2 UE-to-network relay UE:
   1) "DHCPv4 server" if only IPv4 address allocation mechanism is supported by the target UE, i.e., acting as a DHCPv4 server;
   2) "IPv6 router" if only IPv6 address allocation mechanism is supported by the target UE, i.e., acting as an IPv6 router;
   3) "DHCPv4 server & IPv6 Router" if both IPv4 and IPv6 address allocation mechanism are supported by the target UE; or
   4) "address allocation not supported" if neither IPv4 nor IPv6 address allocation mechanism is supported by the target UE and the target UE is not acting as a 5G ProSe layer-3 UE-to-network relay UE;
NOTE 4: The UE doesn't include an IP address configuration IE nor a link local IPv6 address IE if Ethernet or Unstructured data unit type is used for communication.
e) shall include a link local IPv6 address IE formed locally based on IETF RFC 4862 [25] if IP address configuration IE is set to "address allocation not supported", the received PROSE DIRECT LINK SECURITY MODE COMPLETE message included a link local IPv6 address IE and the target UE is neither acting as a 5G ProSe layer-2 UE-to-network relay UE nor acting as a 5G ProSe layer-3 relay UE; and
f) shall include the configuration of UE PC5 unicast user plane security protection based on the agreed user plane security policy, as specified in 3GPP TS 33.503 [34].

After the PROSE DIRECT LINK ESTABLISHMENT ACCEPT message is generated, the target UE shall pass this message to the lower layers for transmission along with the initiating UE's layer-2 ID for unicast communication and the target UE's layer-2 ID for unicast communication and shall start timer T5090 if:

a) at least one of ProSe identifiers for the 5G ProSe direct links satisfies the privacy requirements as specified in clause 5.2.4; or
b) T5090 is configured as specified in clause 5.2.5.
NOTE 5: Two UEs negotiate the PC5 DRX configuration in the AS layer, and the PC5 DRX parameter values are configured per pair of source and destination Layer-2 IDs in the AS layer, as specified in 3GPP TS 38.300 [21].

After sending the PROSE DIRECT LINK ESTABLISHMENT ACCEPT message, the target UE shall provide the following information along with the layer-2 IDs to the lower layer, which enables the lower layer to handle the coming PC5 signalling or traffic data:

a) the PC5 link identifier self-assigned for this 5G ProSe direct link;
b) PQFI(s) and its corresponding PC5 QoS parameters, if available; and
c) an indication of activation of the PC5 unicast user plane security protection for the 5G ProSe direct link, if applicable.

If the target UE accepts the 5G ProSe direct link establishment request and the 5G ProSe direct link is established not for 5G ProSe direct communication between the 5G ProSe remote UE and the 5G ProSe UE-to-network relay UE, then the target UE may perform the PC5 QoS flow establishment over 5G ProSe direct link as specified in clause 7.2.7. If the 5G ProSe direct link is established for 5G ProSe direct communication between the 5G ProSe layer-3 remote UE and the 5G ProSe layer-3 UE-to-network relay UE, then the target UE may perform the PC5 QoS flow establishment over 5G ProSe direct link as specified in clause 8.2.6.

7.2.2.4 5G ProSe Direct Link Establishment Procedure Completion by the Initiating UE If the Target user info IE is included in the PROSE DIRECT LINK ESTABLISHMENT REQUEST message, upon receipt of the PROSE DIRECT LINK ESTABLISHMENT ACCEPT message, the initiating UE shall stop timer T5080. If the Target user info IE is not included in the PROSE DIRECT LINK ESTABLISHMENT REQUEST message the initiating UE may keep the timer T5080 running and continue to handle multiple response messages (i.e., the PROSE DIRECT LINK ESTABLISHMENT ACCEPT message) from multiple target UEs.

For each of the PROSE DIRECT LINK ESTABLISHMENT ACCEPT message received, the initiating UE shall uniquely assign a PC5 link identifier and create a 5G ProSe direct link context for each of the 5G ProSe direct link(s). Then the initiating UE shall store the source layer-2 ID and the destination layer-2 ID used in the transport of this message provided by the lower layers in the 5G ProSe direct link context(s) to complete the establishment of the 5G ProSe direct link with the target UE(s). From this time onward the initiating UE shall use the established link(s) for ProSe direct communication over PC5 and additional PC5 signalling messages to the target UE(s).

After receiving the PROSE DIRECT LINK ESTABLISHMENT ACCEPT message, the initiating UE shall provide the following information along with the layer-2 IDs to the lower layer, which enables the lower layer to handle the coming PC5 signalling or traffic data:

a) the PC5 link identifier self-assigned for this 5G ProSe direct link;
b) PQFI(s) and its corresponding PC5 QoS parameters, if available; and
c) an indication of activation of the PC5 unicast user plane security protection for the 5G ProSe direct link, if applicable.

The initiating UE shall start timer T5090 if:

a) at least one of ProSe identifiers for the 5G ProSe direct links satisfies the privacy requirements as specified in clause 5.2.4; or
b) T5090 is configured as specified in clause 5.2.5.

In addition, the initiating UE may perform the PC5 QoS flow establishment over 5G ProSe direct link as specified in clause 7.2.7.

Upon expiry of the timer T5080, if the PROSE DIRECT LINK ESTABLISHMENT REQUEST message did not include the Target user info IE and the initiating UE received at least one PROSE DIRECT LINK ESTABLISHMENT ACCEPT message, it is up to the UE implementation to consider the 5G ProSe direct link establishment procedure as complete or to restart the timer T5080.

[ . . . ]

7.2.3 5G ProSe Direct Link Modification Procedure

7.2.3.1 General

The purpose of the 5G ProSe direct link modification procedure is to modify the existing ProSe direct link to:
- a) add new PC5 QoS flow(s) to the existing 5G ProSe direct link;
- b) modify existing PC5 QoS flow(s) for updating PC5 QoS parameters of the existing PC5 QoS flow(s);
- c) modify existing PC5 QoS flow(s) for associating new ProSe application(s) with the existing PC5 QoS flow(s);
- d) modify existing PC5 QoS flow(s) for removing the associated ProSe application(s) from the existing PC5 QoS flow(s); or
- e) remove existing PC5 QoS flow(s) from the existing 5G ProSe direct link.

In this procedure, the UE sending the PROSE DIRECT LINK MODIFICATION REQUEST message is called the "initiating UE" and the other UE is called the "target UE".

NOTE: The 5G ProSe direct link modification procedure is not applicable for 5G ProSe layer-2 UE-to-network relay case.

7.2.3.2 5G ProSe Direct Link Modification Procedure Initiated by Initiating UE The initiating UE shall meet the following pre-conditions before initiating this procedure for adding a new ProSe application to the existing 5G ProSe direct link:
- a) there is a 5G ProSe direct link between the initiating UE and the target UE;
- b) the pair of application layer IDs and the network layer protocol of this 5G ProSe direct link are identical to those required by the application layer in the initiating UE for this ProSe application; and
- c) the security policy corresponding to the ProSe identifier is aligned with the security policy of the existing 5G ProSe direct link.

After receiving the service data or request from the upper layers, the initiating UE shall perform the PC5 QoS flow match as specified in clause 7.2.8. If there is no matched PC5 QoS flow, the initiating UE shall derive the PC5 QoS parameters and assign the PQFI(s) for the PC5 QoS flows(s) to be established as specified in clause 7.2.7.

If the 5G ProSe direct link modification procedure is to add new PC5 QoS flow(s) to the existing 5G ProSe direct link, the initiating UE shall create a PROSE DIRECT LINK MODIFICATION REQUEST message. In this message, initiating UE:
- a) shall include the PQFI(s), the corresponding PC5 QoS parameters and optionally the ProSe identifier(s);
- b) shall include the link modification operation code set to "Add new PC5 QoS flow(s) to the existing 5G ProSe direct link"; and
- c) may include the PC5 QoS rule(s) to indicate the packet filters of the PC5 QoS flow(s).

If the 5G ProSe direct link modification procedure is to modify the PC5 QoS parameters for existing PC5 QoS flow(s) in the existing 5G ProSe direct link, the initiating UE shall create a PROSE DIRECT LINK MODIFICATION REQUEST message. In this message, the initiating UE:
- a) shall include the PQFI(s) and the corresponding PC5 QoS parameters, including the ProSe identifier(s);
- b) shall include the link modification operation code set to "Modify PC5 QoS parameters of the existing PC5 QoS flow(s)"; and
- c) may include the PC5 QoS rule(s) to indicate the packet filters of the PC5 QoS flow(s).

If the 5G ProSe direct link modification procedure is to associate new ProSe application(s) with existing PC5 QoS flow(s), the initiating UE shall create a PROSE DIRECT LINK MODIFICATION REQUEST message. In this message, the initiating UE:
- a) shall include the PQFI(s) and the corresponding PC5 QoS parameters, including the ProSe identifier(s);
- b) shall include the link modification operation code set to "Associate new ProSe application(s) with existing PC5 QoS flow(s)"; and
- c) may include the PC5 QoS rule(s) to indicate the packet filters of the PC5 QoS flow(s).

If the PC5 5G ProSe direct link modification procedure is to remove the associated ProSe application(s) from existing PC5 QoS flow(s), the initiating UE shall create a PROSE DIRECT LINK MODIFICATION REQUEST message. In this message, the initiating UE:
- a) shall include the PQFI(s) and the corresponding PC5 QoS parameters including the ProSe identifier(s); and
- b) shall include the link modification operation code set to "Remove ProSe application(s) from existing PC5 QoS flow(s)".

If the direct link modification procedure is to remove any PC5 QoS flow(s) from the existing 5G ProSe direct link, the initiating UE shall create a PROSE DIRECT LINK MODIFICATION REQUEST message. In this message, the initiating UE:
- a) shall include the PQFI(s); and
- b) shall include the link modification operation code set to "Remove existing PC5 QoS flow(s) from the existing 5G ProSe direct link".

After the PROSE DIRECT LINK MODIFICATION REQUEST message is generated, the initiating UE shall pass this message to the lower layers for transmission along with the initiating UE's layer-2 ID for 5G ProSe direct communication and the target UE's layer-2 ID for 5G ProSe direct communication and start timer T5081. The UE shall not send a new PROSE DIRECT LINK MODIFICATION REQUEST message to the same target UE while timer T5081 is running.

Figure 8:
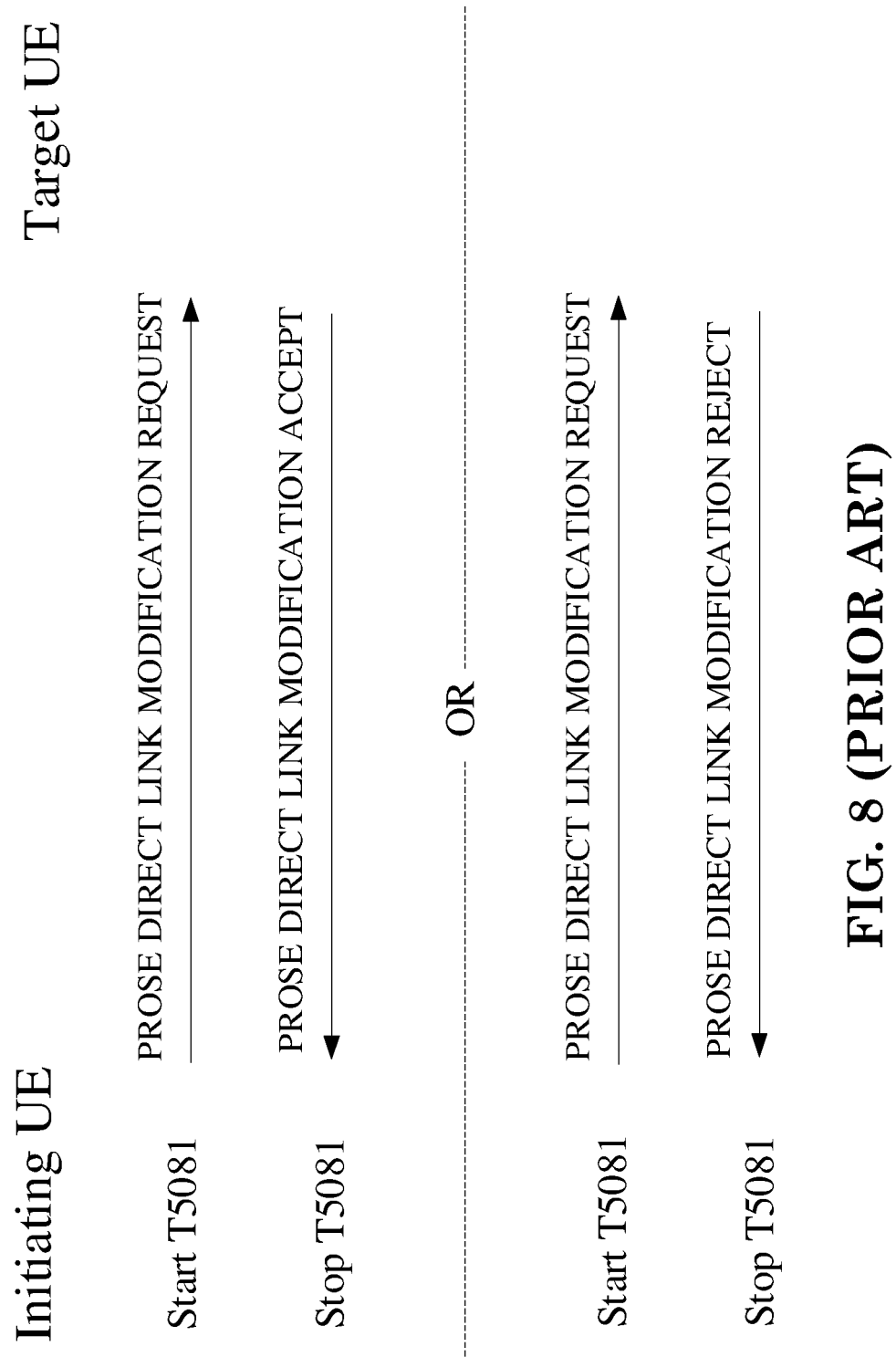
FIG. 8 is a reproduction of FIG. 7.2.3.2.1 of 3GPP TS 24.554 V17.4.0.

[FIG. 7.2.3.2.1 of 3GPP TS 24.554 V17.4.0, Entitled "5G ProSe Direct Link Modification Procedure", is Reproduced as FIG. 8]

7.2.3.3 5G ProSe direct link modification procedure accepted by the target UE If the PROSE DIRECT LINK MODIFICATION REQUEST message is accepted, the target UE shall respond with the PROSE DIRECT LINK MODIFICATION ACCEPT message.

If the PROSE DIRECT LINK MODIFICATION REQUEST message is to add a new ProSe application, add new PC5 QoS flow(s) or modify any existing PC5 QoS flow(s) in the 5G ProSe direct link, the target UE:
- a) shall include the PQFI(s), the corresponding PC5 QoS parameters and optionally the ProSe identifier(s) that the target UE accepts; and
- b) may include the PC5 QoS rule(s) to indicate the packet filters of the PC5 QoS flow(s); in the PROSE DIRECT LINK MODIFICATION ACCEPT message.

If the PROSE DIRECT LINK MODIFICATION REQUEST message is to remove an existing ProSe application from the 5G ProSe direct link, the target UE shall delete the ProSe identifier received in the PROSE DIRECT LINK MODIFICATION REQUEST message and the corresponding PQFI(s) and PC5 QoS parameters from the profile associated with the 5G ProSe direct link.

If the PROSE DIRECT LINK MODIFICATION REQUEST message is to remove existing PC5 QoS flow(s) from the PC5 5G ProSe direct link, the target UE shall delete the PQFI(s) and the corresponding PC5 QoS parameters from the profile associated with the 5G ProSe direct link.

If the PROSE DIRECT LINK MODIFICATION REQUEST message is to add a new ProSe application, add new PC5 QoS flow(s) or modify any existing PC5 QoS flow(s) in the 5G ProSe direct link, after sending the PROSE DIRECT LINK MODIFICATION ACCEPT message, the target UE shall provide the added or modified PQFI(s) and corresponding PC5 QoS parameters along with PC5 link identifier to the lower layer.

If the PROSE DIRECT LINK MODIFICATION REQUEST message is to remove an existing ProSe application or to remove the existing PC5 QoS flow(s) from the 5G ProSe direct link, after sending the PROSE DIRECT LINK MODIFICATION ACCEPT message, the target UE shall provide the removed PQFI(s) along with the PC5 link identifier to the lower layer.

If the 5G ProSe direct link is for 5G ProSe direct communication between the 5G ProSe remote UE and the 5G ProSe layer-3 UE-to-network relay UE, and if the initiating UE is the 5G ProSe remote UE, then the target UE (as the 5G ProSe layer-3 UE-to-network relay UE) performs the QoS flows handling procedure as specified in clause 8.2.6.3.3 and clause 8.2.6.4.2.

If the target UE accepts the 5G ProSe direct link modification request, then the target UE may perform the PC5 QoS flow establishment over 5G ProSe direct link as specified in clause 7.2.7 and perform the PC5 QoS flow match over 5G ProSe direct link as specified in clause 7.2.8.

7.2.3.4 5G ProSe Direct Link Modification Procedure Completion by the Initiating UE Upon receipt of the PROSE DIRECT LINK MODIFICATION ACCEPT message, the initiating UE shall stop timer T5081.

Upon receipt of the PROSE DIRECT LINK MODIFICATION ACCEPT message, if the PROSE DIRECT LINK MODIFICATION REQUEST message is to add a new ProSe application, add new PC5 QoS flow(s) or modify any existing PC5 QoS flow(s) in the 5G ProSe direct link, the initiating UE shall provide the added or modified PQFI(s) and corresponding PC5 QoS parameters along with PC5 link identifier to the lower layer.

Upon receipt of the PROSE DIRECT LINK MODIFICATION ACCEPT message, if the PROSE DIRECT LINK MODIFICATION REQUEST message is to remove an existing ProSe application or to remove the existing PC5 QoS flow(s) from the 5G ProSe direct link, the initiating UE shall provide the removed PQFI(s) along with the PC5 link identifier to the lower layer.

7.2.3.5 5G ProSe Direct Link Modification Procedure not Accepted by the Target UE If the 5G ProSe direct link modification request cannot be accepted, the target UE shall send a PROSE DIRECT LINK MODIFICATION REJECT message. The PROSE DIRECT LINK MODIFICATION REJECT message contains a PC5 signalling protocol cause IE set to one of the following cause values:

5 lack of resources for 5G ProSe direct link;
6 required service not allowed;
12 security policy not aligned;
16 lack of local capabilities; or
111 protocol error, unspecified.

If the target UE is not allowed to accept this request, e.g., because the ProSe application to be added is not allowed per the operator policy or configuration parameters for ProSe communication over PC5 as specified in clause 5.2.4, the target UE shall send a PROSE DIRECT LINK MODIFICATION REJECT message with PC5 signalling protocol cause value #6 "required service not allowed".

If the 5G ProSe direct link modification fails due to the congestion problems or other temporary lower layer problems causing resource constraints, the target UE shall send a PROSE DIRECT LINK MODIFICATION REJECT message with PC5 signalling protocol cause value #5 "lack of resources for 5G ProSe direct link".

If the link modification operation code is set to "Associate new ProSe application(s) with existing PC5 QoS flow(s)" and the security policy corresponding to the ProSe identifier(s) is not aligned with the security policy applied to the existing 5G ProSe direct link, then the target UE shall send a PROSE DIRECT LINK MODIFICATION REJECT message with PC5 signalling protocol cause value #12 "security policy not aligned".

If the link modification operation requires the addition of new PC5 QoS flow(s) but the target UE cannot support additional packet filters which would be required on the existing PDU session of the target UE, then the target UE shall send a PROSE DIRECT LINK MODIFICATION REJECT message with PC5 signalling protocol cause value #16"lack of local capabilities". For other reasons causing the failure of link modification, the target UE shall send a PROSE DIRECT LINK MODIFICATION REJECT message with PC5 signalling protocol cause value #111 "protocol error, unspecified".

Upon receipt of the PROSE DIRECT LINK MODIFICATION REJECT message, the initiating UE shall stop timer T5081 and abort the 5G ProSe direct link modification procedure. If the PC5 signalling protocol cause value in the PROSE DIRECT LINK MODIFICATION REJECT message is #11 "required service not allowed" or #5 "lack of resources for 5G ProSe direct link" or #12 "security policy not aligned", then the initiating UE shall not attempt to start 5G ProSe direct link modification with the same target UE to add the same ProSe application, or to add or modify the same PC5 QoS flow(s) at least for a time period T.

NOTE: The length of time period T is UE implementation specific and can be different for the case when the UE receives PC5 signalling protocol cause value #11 "required service not allowed" or when the UE receives PC5 signalling protocol cause value #5 "lack of resources for 5G ProSe direct link" or when the UE receives PC5 signalling protocol cause value #12 "security policy not aligned". The length of time period T is not less than 30 minutes.

7.2.3.6 Abnormal Cases 7.2.3.6.1 Abnormal Cases at the Initiating UE

The following abnormal cases can be identified:

a) If timer T5081 expires, the initiating UE shall retransmit the PROSE DIRECT LINK MODIFICATION REQUEST message and restart timer T5081. After reaching the maximum number of allowed retransmissions, the initiating UE shall abort the 5G ProSe direct link modification procedure and may notify the upper layer that the target UE is unreachable.

NOTE 1: The maximum number of allowed retransmissions is UE implementation specific.

NOTE 2: After reaching the maximum number of allowed retransmissions, whether the initiating UE releases this 5G ProSe direct link depends on its implementation.

b) For the same 5G ProSe direct link, if the initiating UE receives a PROSE DIRECT LINK RELEASE REQUEST message after the initiation of UE-requested 5G ProSe direct link modification procedure, the initiating UE shall stop the timer T5081 and abort the 5G ProSe direct link modification procedure and proceed with the 5G ProSe direct link release procedure.

c) For the same 5G ProSe direct link, if the initiating UE receives a PROSE DIRECT LINK MODIFICATION REQUEST message during the 5G ProSe direct link modification procedure, the initiating UE shall stop the timer T5081 and abort the 5G ProSe direct link modification procedure. Following handling is implementation dependent, e.g., the initiating UE waits for an implementation dependent time for initiating a new 5G ProSe direct link modification procedure, if still needed.

NOTE 3: The implementation dependent timer value needs to be set to avoid further collisions (e.g., random timer value).

7.2.3.6.2 Abnormal Cases at the Target UE

The following abnormal cases can be identified:

a) For the same 5G ProSe direct link, if the target UE receives a PROSE DIRECT LINK RELEASE REQUEST message during the 5G ProSe direct link modification procedure, the target UE shall stop all running timers for this 5G ProSe direct link, abort the 5G ProSe direct link modification procedure and proceed with the 5G ProSe direct link release procedure.

7.2.4 5G ProSe Direct Link Identifier Update Procedure 7.2.4.1 General

The 5G ProSe direct link identifier update procedure is used to update and exchange the new identifiers (e.g., application layer ID, layer-2 ID, security information and IP address/prefix) between two UEs for a 5G ProSe direct link before using the new identifiers. The UE sending the PROSE DIRECT LINK IDENTIFIER UPDATE REQUEST message is called the "initiating UE" and the other UE is called the "target UE".

7.2.4.2 5G ProSe Direct Link Identifier Update Procedure Initiation by Initiating UE The initiating UE shall initiate the procedure if:

a) the initiating UE receives a request from upper layers to change the application layer ID and there is an existing 5G ProSe direct link associated with this application layer ID; or b) the privacy timer (see clause 5.2.4) of the initiating UE's layer-2 ID expires for an existing 5G ProSe direct link.

If the 5G ProSe direct link identifier update procedure is triggered by a change of the initiating UE's application layer ID, the initiating UE shall create a PROSE DIRECT LINK IDENTIFIER UPDATE REQUEST message. In this message, the initiating UE:

a) shall include the initiating UE's new application layer ID received from upper layer;

b) shall include the initiating UE's new layer-2 ID assigned by itself;

c) shall include the new MSB of $K_{NRP}$-sess ID; and d) shall include the new IP address/prefix if IP communication is used and the 5G ProSe direct link is not for 5G ProSe direct communication between 5G ProSe layer-2 remote UE and 5G ProSe layer-2 UE-to-network relay UE.

If the 5G ProSe direct link identifier update procedure is triggered by the expiry of the initiating UE's privacy timer T5090 as specified in clause 5.2.4 and clause 5.2.5, the initiating UE shall create a PROSE DIRECT LINK IDENTIFIER UPDATE REQUEST message. In this message, the initiating UE:

a) shall include the initiating UE's new layer-2 ID assigned by itself;

b) shall include the new MSB of $K_{NRP\text{-}sess}$ ID;

c) may include the initiating UE's new application layer ID if received from upper layer; and d) shall include the new IP address/prefix if IP communication is used and changed and the 5G ProSe direct link is not for 5G ProSe direct communication between 5G ProSe layer-2 remote UE and 5G ProSe layer-2 UE-to-network relay UE.

After the PROSE DIRECT LINK IDENTIFIER UPDATE REQUEST message is generated, the initiating UE shall pass this message to the lower layers for transmission along with the initiating UE's old layer-2 ID for 5G ProSe direct communication and the target UE's layer-2 ID for 5G ProSe direct communication and start timer T5082. The UE shall not send a new PROSE DIRECT LINK IDENTIFIER UPDATE REQUEST message to the same target UE while timer T5082 is running.

Figure 9:
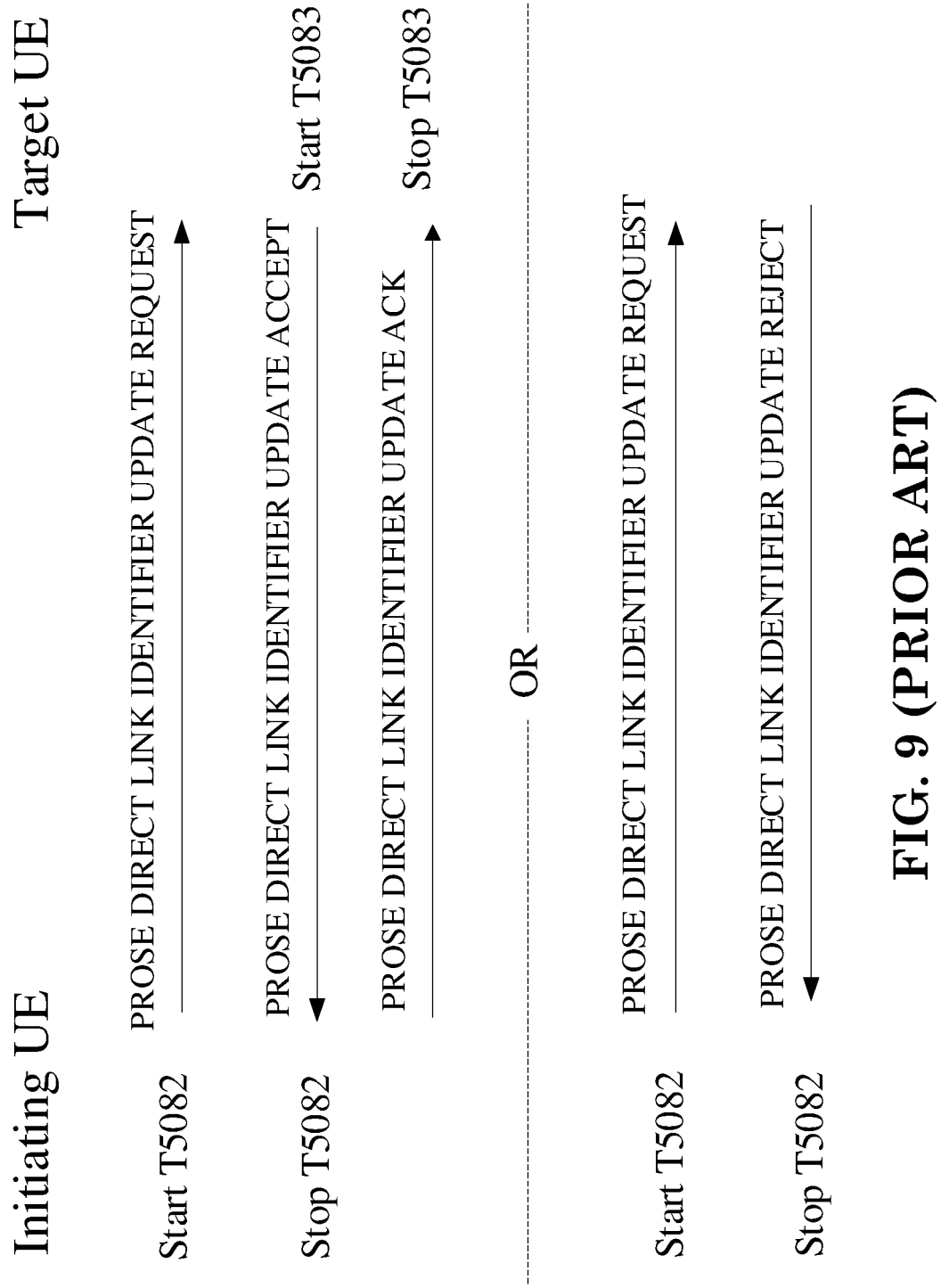
FIG. 9 is a reproduction of FIG. 7.2.4.2.1 of 3GPP TS 24.554 V17.4.0.

[FIG. 7.2.4.2.1 of 3GPP TS 24.554 V17.4.0, Entitled "5G ProSe Direct Link Identifier Update Procedure", is Reproduced as FIG. 9]

7.2.4.3 5G ProSe Direct Link Identifier Update Procedure Accepted by the Target UE Upon receipt of a PROSE DIRECT LINK IDENTIFIER UPDATE REQUEST message, if the target UE determines:

a) the 5G ProSe direct link associated with this request message is still valid; and b) the timer T5083 for the 5G ProSe direct link identified by this request message is not running, then the target UE accepts this request and responds with a PROSE DIRECT LINK IDENTIFIER UPDATE ACCEPT message.

The target UE shall create the PROSE DIRECT LINK IDENTIFIER UPDATE ACCEPT message. In this message, the target UE:

a) shall include the target UE's new layer-2 ID assigned by itself;

b) shall include the new LSB of $K_{NRP\text{-}sess}$ ID;

c) shall include the initiating UE's new MSB of $K_{NRP\text{-}sess}$ ID;

d) shall include the initiating UE's new layer-2 ID;

e) shall include the target UE's new application layer ID if received from upper layer;

f) shall include the initiating UE's new IP address/prefix if received from the initiating UE and IP communication is used;

g) shall include the initiating UE's new application layer ID if received from the initiating UE; and h) shall include the target UE's new IP address/prefix if IP communication is used and changed and the 5G ProSe direct link is not for 5G ProSe direct communication between 5G ProSe layer-2 remote UE and 5G ProSe layer-2 UE-to-network relay UE.

After the PROSE DIRECT LINK IDENTIFIER UPDATE ACCEPT message is generated, the target UE shall pass this message to the lower layers for transmission along with the initiating UE's old layer-2 ID for 5G ProSe direct communication and the target UE's old layer-2 ID for 5G ProSe direct communication and start timer T5083. The UE shall not send a new PROSE DIRECT LINK IDENTIFIER UPDATE ACCEPT message to the same initiating UE while timer T5083 is running. Before target UE receives the traffic using the new layer-2 IDs, the target UE shall continue to receive the traffic with the old layer-2 IDs (i.e., initiating UE's old layer-2 ID and target UE's old layer-2 ID) from initiating UE.

Before target UE receives the PROSE DIRECT LINK IDENTIFIER UPDATE ACK message from initiating UE, the target UE shall keep sending traffic to the initiating UE using the old layer-2 IDs (i.e., initiating UE's old layer-2 ID for 5G ProSe direct communication and target UE's old layer-2 ID for 5G ProSe direct communication).

7.2.4.4 5G ProSe Direct Link Identifier Update Procedure Acknowledged by the Initiating UE Upon receipt of the PROSE DIRECT LINK IDENTIFIER UPDATE ACCEPT message, the initiating UE shall stop timer T5082 and respond with a PROSE DIRECT LINK IDENTIFIER UPDATE ACK message. In this message, the initiating UE:

a) shall include the target UE's new layer-2 ID;
b) shall include the target UE's new LSB of $K_{NR}$P-sess ID;
c) shall include the target UE's new application layer ID, if received; and
d) shall include the target UE's new IP address/prefix, if received.

After the PROSE DIRECT LINK IDENTIFIER UPDATE ACK message is generated, the initiating UE shall pass this message to the lower layers for transmission along with the initiating UE's old layer-2 ID for 5G ProSe direct communication and the target UE's old layer-2 ID for 5G ProSe direct communication and shall stop timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5.

Upon sending the PROSE DIRECT LINK IDENTIFIER UPDATE ACK message, the initiating UE shall update the associated 5G ProSe direct link context with the new identifiers and pass the new layer-2 IDs (i.e., initiating UE's new layer-2 ID for 5G ProSe direct communication and target UE's new layer-2 ID for 5G ProSe direct communication) along with the PC5 link identifier down to the lower layer. Then the initiating UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data.

The initiating UE shall continue to receive traffic with the old layer-2 IDs (i.e., initiating UE's old layer-2 ID for 5G ProSe direct communication and target UE's old layer-2 ID for 5G ProSe direct communication) from the target UE until it receives traffic with the new layer-2 IDs (i.e., initiating UE's new layer-2 ID and target UE's new layer-2 ID) from the target UE.

7.2.4.5 5G ProSe Direct Link Identifier Update Procedure Completion by the Target UE Upon receipt of the PROSE DIRECT LINK IDENTIFIER UPDATE ACK message, the target UE shall update the associated 5G ProSe direct link context with the new identifiers, pass the new layer-2 IDs (i.e., initiating UE's new layer-2 ID and target UE's new layer-2 ID) down to the lower layer, stop timer T5083 and timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5. Then the target UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data.

7.2.4.6 5G ProSe Direct Link Identifier Update Procedure not Accepted by the Target UE If the PROSE DIRECT LINK IDENTIFIER UPDATE REQUEST message cannot be accepted, the target UE shall send a PROSE DIRECT LINK IDENTIFIER UPDATE REJECT message. The PROSE DIRECT LINK IDENTIFIER UPDATE REJECT message contains a PC5 signalling protocol cause IE set to one of the following cause values:

3 conflict of layer-2 ID for 5G ProSe direct communication is detected; or
111 protocol error, unspecified.

For a received PROSE DIRECT LINK IDENTIFIER UPDATE REQUEST message from a layer-2 ID (for 5G ProSe direct communication), if the target UE already has an existing link using this layer-2 ID or is currently processing a PROSE DIRECT LINK IDENTIFIER UPDATE REQUEST message from the same layer-2 ID, but with user info different from the user info IE included in this new incoming message, the target UE shall send a PROSE DIRECT LINK IDENTIFIER UPDATE REJECT message with PC5 signalling protocol cause value #3 "conflict of layer-2 ID for 5G ProSe direct communication is detected".

NOTE: After receiving the PROSE DIRECT LINK IDENTIFIER UPDATE REJECT message, whether the initiating UE initiates the 5G ProSe direct link release procedure or initiates another 5G ProSe direct link identifier update procedure with a new layer-2 ID depends on UE implementation.

For other reasons causing the failure of link identifier update, the target UE shall send a PROSE DIRECT LINK IDENTIFIER UPDATE REJECT message with PC5 signalling protocol cause value #111"protocol error, unspecified".

Upon receipt of the PROSE DIRECT LINK IDENTIFIER UPDATE REJECT message, the initiating UE shall stop timer T5082 and abort this 5G ProSe direct link identifier update procedure. 7.2.4.7 Abnormal Cases 7.2.4.7.1 Abnormal Cases at the Initiating UE The following abnormal cases can be identified:

a) If timer T5082 expires, the initiating UE shall retransmit the PROSE DIRECT LINK IDENTIFIER UPDATE REQUEST message and restart timer T5082. After reaching the maximum number of allowed retransmissions, the initiating UE shall abort the 5G ProSe direct link identifier update procedure and may notify the upper layer that the target UE is unreachable.
NOTE 1: The maximum number of allowed retransmissions is UE implementation specific.
NOTE 2: After reaching the maximum number of allowed retransmissions, whether the initiating UE releases this 5G ProSe direct link depends on its implementation.
b) For the same 5G ProSe direct link, if the initiating UE receives a PROSE DIRECT LINK IDENTIFIER UPDATE REQUEST message during the 5G ProSe direct link identifier update procedure, the initiating UE shall stop the timer T5082 and abort the 5G ProSe direct link identifier update procedure. Following handling is implementation dependent, e.g., the initiating UE waits for an implementation dependent time for initiating a new 5G ProSe direct link identifier update procedure, if still needed.
NOTE 3: The implementation dependent timer value needs to be set to avoid further collisions (e.g., random timer value).

c) For the same 5G ProSe direct link, if the initiating UE receives a PROSE DIRECT LINK REKEYING REQUEST message after initiating the 5G ProSe direct link identifier update procedure, the initiating UE shall ignore the PROSE DIRECT LINK REKEYING REQUEST message and proceed with the 5G ProSe direct link identifier update procedure.

d) For the same 5G ProSe direct link, if the initiating UE receives a PROSE DIRECT LINK RELEASE REQUEST message after the initiation of 5G ProSe direct link identifier update procedure, the initiating UE shall stop the timer T5082 and abort the 5G ProSe direct link identifier update procedure and proceed with the 5G ProSe direct link release procedure.

e) After sending the PROSE DIRECT LINK IDENTIFIER UPDATE ACK message to the target UE, if another PROSE DIRECT LINK IDENTIFIER UPDATE ACCEPT message from the target UE is received before the traffic from the target UE with the new layer-2 IDs is received, the initiating UE shall retransmit the PROSE DIRECT LINK IDENTIFIER UPDATE ACK message along with the initiating UE's old layer-2 ID and the target UE's old layer-2 ID.

NOTE 4: It is up to implementation to handle the failure of traffic delivery for new layer-2 IDs if such traffic has been sent before the initiating UE retransmits the PROSE DIRECT LINK IDENTIFIER UPDATE ACK message.

f) After sending the PROSE DIRECT LINK IDENTIFIER UPDATE ACK message to the target UE, if the initiating UE keeps receiving traffic from the target UE with the old layer-2 IDs and traffic from the target UE with the new layer-2 IDs is not received during an implementation specific time which is greater than the value of timer T5083, the initiating UE shall abort the 5G ProSe direct link identifier update procedure and may release the 5G ProSe direct link.

7.2.4.7.2 Abnormal Cases at the Target UE

The following abnormal cases can be identified:

a) If timer T5083 expires, the target UE shall retransmit the PROSE DIRECT LINK IDENTIFIER UPDATE ACCEPT message and restart timer T5083. After reaching the maximum number of allowed retransmissions, the target UE shall abort the 5G ProSe direct link identifier update procedure and may notify the upper layer that the initiating UE is unreachable.

NOTE 1: The maximum number of allowed retransmissions is UE implementation specific.

NOTE 2: After reaching the maximum number of allowed retransmissions, whether the target UE releases this 5G ProSe direct link depends on its implementation.

b) If PROSE DIRECT LINK IDENTIFIER UPDATE REQUEST is received when the timer T5083 is running, the target UE shall stop the timer T5083 and abort the ongoing 5G ProSe direct link identifier update procedure. The target UE shall handle the new PROSE DIRECT LINK IDENTIFIER UPDATE REQUEST as specified in clause 7.2.4.3.

c) For the same 5G ProSe direct link, if the target UE receives a PROSE DIRECT LINK RELEASE REQUEST message during the 5G ProSe direct link identifier update procedure, the target UE shall stop the timer T5083, abort the 5G ProSe direct link identifier update procedure and proceed with the 5G ProSe direct link release procedure.

[ . . . ]

7.2.10 5G ProSe Direct Link Security Mode Control Procedure 7.2.10.1 General

The 5G ProSe direct link security mode control procedure is used to establish security between two UEs during a 5G ProSe direct link establishment procedure or a 5G ProSe direct link re-keying procedure. Security is not established if the UE PC5 signalling integrity protection is not activated. After successful completion of the 5G ProSe direct link security mode control procedure, the selected security algorithms and their non-null associate keys are used to integrity protect and cipher all PC5 signalling messages exchanged over this 5G ProSe direct link between the UEs and the security context can be used to protect all PC5 user plane data exchanged over this 5G ProSe direct link between the UEs. The UE sending the PROSE DIRECT LINK SECURITY MODE COMMAND message is called the "initiating UE" and the other UE is called the "target UE".

7.2.10.2 5G ProSe Direct Link Security Mode Control Procedure Initiation by the Initiating UE The initiating UE shall meet the following pre-conditions before initiating the 5G ProSe direct link security mode control procedure:

a) the target UE has initiated a 5G ProSe direct link establishment procedure toward the initiating UE by sending a PROSE DIRECT LINK ESTABLISHMENT REQUEST message and:

1) the PROSE DIRECT LINK ESTABLISHMENT REQUEST message:

i) includes a target user info IE which includes the application layer ID of the initiating UE; or ii) does not include a target user info IE and the initiating UE is interested in the ProSe service identified by the ProSe identifier in the PROSE DIRECT LINK ESTABLISHMENT REQUEST message; and 2) the initiating UE:

i) if the direct communication is not between the 5G ProSe remote UE and the 5G ProSe UE-to-network relay UE has either identified an existing $K_{NRP}$ based on the $K_{NRP}$ ID included in the PROSE DIRECT LINK ESTABLISHMENT REQUEST message or derived a new $K_{NRP}$;

ii) if the direct communication is between the 5G ProSe remote UE and the 5G ProSe UE-to-network relay UE with the security procedure over user plane being used, has received a new $K_{NRP}$ according to the security procedure over user plane as specified in 3GPP TS 33.503 [34];

iii) if the direct communication is between the 5G ProSe remote UE and the 5G ProSe UE-to-network relay UE with the security procedure over control plane being used, has received a new $K_{NR\_ProSe}$ according to the security procedure over control plane as specified in 3GPP TS 33.503 [34]; or iv) has decided not to activate security protection based on its UE 5G ProSe direct signalling security policy and the target UE's 5G ProSe direct signalling security policy; or b) the target UE has initiated a 5G ProSe direct link re-keying procedure toward the initiating UE by sending a PROSE DIRECT LINK REKEYING REQUEST message and:

1) if the target UE has included a Re-authentication indication in the PROSE DIRECT LINK REKEYING REQUEST message, the initiating UE has derived a new $K_{NRP}$.

When:
  a) the direct communication is not between the 5G ProSe remote UE and the 5G ProSe UE-to-network relay UE, if a new $K_{NRP}$ has been derived by the initiating UE; or
  b) the direct communication is between the 5G ProSe remote UE and the 5G ProSe UE-to-network relay UE, if a new $K_{NRP}$ or $K_{NR\_ProSe}$ has been received by the initiating UE according to the security procedure over user plane or the security procedure over control plane, respectively, as specified in 3GPP TS 33.503 [34];

the initiating UE shall generate the 2 MSBs of $K_{NRP}$ ID to ensure that the resultant $K_{NRP}$ ID will be unique in the initiating UE.

NOTE 1: If the direct communication is not between the 5G ProSe remote UE and the 5G ProSe UE-to-network relay UE, the $K_{NRP}$ ID holds the ID that corresponds to $K_{NRP}$. If the direct communication is between the 5G ProSe remote UE and the 5G ProSe UE-to-network relay UE, the $K_{NRP}$ ID holds the ID that corresponds to $K_{NRP}$ (if security procedure over user plane is used) or $K_{NR\_ProSe}$ (if security procedure over control plane is used).

The initiating UE shall select security algorithms in accordance with its UE 5G ProSe direct signalling security policy and the target UE's 5G ProSe direct signalling security policy. If the 5G ProSe direct link security mode control procedure was triggered during a 5G ProSe direct link establishment procedure, the initiating UE shall not select the null integrity protection algorithm if the initiating UE or the target UE's 5G ProSe direct signalling integrity protection policy is set to "Signalling integrity protection required". If the 5G ProSe direct link security mode control procedure was triggered during a 5G ProSe direct link re-keying procedure, the initiating UE:
  a) shall not select the null integrity protection algorithm if the integrity protection algorithm currently in use for the 5G ProSe direct link is different from the null integrity protection algorithm;
  b) shall not select the null ciphering protection algorithm if the ciphering protection algorithm currently in use for the 5G ProSe direct link is different from the null ciphering protection algorithm;
  c) shall select the null integrity protection algorithm if the integrity protection algorithm currently in use is the null integrity protection algorithm; and
  d) shall select the null ciphering protection algorithm if the ciphering protection algorithm currently in use is the null ciphering protection algorithm.

Then the initiating UE shall:
  a) if the direct communication is not between the 5G ProSe remote UE and the 5G ProSe UE-to-network relay UE:
    1) generate a 128-bit Nonce_2 value;
    2) derive $K_{NRP}$-Sess from Nonce_1 received in the PROSE DIRECT LINK ESTABLISHMENT REQUEST message, $K_{NRP}$ and Nonce_2, as specified in 3GPP TS 33.536 [37]; and
    3) derive the NR PC5 encryption key NRPEK and the NR PC5 integrity key NRPIK from $K_{NRP}$-sess and the selected security algorithms as specified in 3GPP TS 33.536 [37];
  b) if the direct communication is between the 5G ProSe remote UE and the 5G ProSe UE-to-network relay UE and the security procedure over control plane as specified in 3GPP TS 33.503 [34] is used:
    1) derive $K_{relay-sess}$ from $K_{NR\_ProSe}$, Nonce_2 and Nonce_1 received in the PROSE DIRECT LINK ESTABLISHMENT REQUEST message as specified in 3GPP TS 33.503 [34]; and
    2) derive the NR PC5 encryption key $K_{relay-enc}$ and the NR PC5 integrity key $K_{relay-int}$ from $K_{relay-sess}$ and the selected security algorithms as specified in 3GPP TS 33.503 [34]; or
  c) if the direct communication is between the 5G ProSe remote UE and the 5G ProSe UE-to-network relay UE and the security procedure over user plane as specified in 3GPP TS 33.503 [34] is used:
    1) derive $K_{NRP}$-sess from $K_{NRP}$, $K_{NRP}$ freshness parameter 2 and $K_{NRP}$ freshness parameter 1 received in the PROSE DIRECT LINK ESTABLISHMENT REQUEST message as specified in 3GPP TS 33.503 [34]; and
    2) derive the NR PC5 encryption key NRPEK and the NR PC5 integrity key NRPIK from $K_{NRP}$-sess and the selected security algorithms as specified in 3GPP TS 33.503 [34]; and
  d) create a PROSE DIRECT LINK SECURITY MODE COMMAND message. In this message, the initiating UE:
    1) shall include the key establishment information container IE if the 5G ProSe direct link is not for direct communication between the 5G ProSe remote UE and the 5G ProSe UE-to-network relay UE and a new $K_{NRP}$ has been derived at the initiating UE and the authentication method used to generate $K_{NRP}$ requires sending information to complete the 5G ProSe direct link authentication procedure;
  NOTE 2: The key establishment information container is provided by upper layers.
    2) shall include the MSBs of $K_{NRP}$ ID IE if a new $K_{NRP}$ has been derived or a new $K_{NRP}$ or $K_{NR\_ProSe}$ has been received at the initiating UE;
    3) shall include a Nonce_2 IE set to:
      i) the 128-bit nonce value generated by the initiating UE when the direct communication is not between the 5G ProSe remote UE and the 5G ProSe UE-to-network relay UE;
      ii) the $K_{NRP}$ freshness parameter 2 value received by the initiating UE when the direct communication is between the 5G ProSe remote UE and the 5G ProSe UE-to-network relay UE with the security procedure over user plane as specified in 3GPP TS 33.503 [34] being used; or
      iii) the Nonce_2 value received by the initiating UE when the direct communication is between the 5G ProSe remote UE and the 5G ProSe UE-to-network relay UE with the security procedure over control plane as specified in 3GPP TS 33.503 [34] being used;
      for the purpose of session key establishment over this 5G ProSe direct link if the selected integrity protection algorithm is not the null integrity protection algorithm;
    4) shall include the selected security algorithms;
    5) shall include the UE security capabilities received from the target UE in the PROSE DIRECT LINK ESTABLISHMENT REQUEST message or PROSE DIRECT LINK REKEYING REQUEST message;

6) shall include the UE 5G ProSe direct signalling security policy received from the target UE in the PROSE DIRECT LINK ESTABLISHMENT REQUEST message;
7) shall include the LSB of $K_{NRP}$-sess ID chosen by the initiating UE as specified in 3GPP TS 33.536 [37] if the selected integrity protection algorithm is not the null integrity protection algorithm;

NOTE 3: If the direct communication is not between the 5G ProSe remote UE and the 5G ProSe UE-to-network relay UE, the $K_{NRP\text{-}sess}$ ID holds the ID that corresponds to $K_{NRP\text{-}sess}$. If the direct communication is between the 5G ProSe remote UE and the 5G ProSe UE-to-network relay UE, the $K_{NRP\text{-}sess}$ ID holds the ID that corresponds to $K_{NRP\text{-}sess}$ (if security procedure over user plane is used) or $K_{relay\text{-}sess}$ (if security procedure over control plane is used).

8) shall include the GPI if received from the 5G PKMF according to the security procedure over user plane as specified in 3GPP TS 33.503 [34], when the direct communication is between the 5G ProSe remote UE and the 5G ProSe UE-to-network relay UE; and
9) shall include the EAP message if received from the network according to the security procedure over control plane as specified in 3GPP TS 33.503 [34], when the direct communication is between the 5G ProSe remote UE and the 5G ProSe UE-to-network relay UE.

If the security protection of this 5G ProSe direct link is activated by using non-null integrity protection algorithm or non-null ciphering protection algorithm, the initiating UE shall form the $K_{NRP\text{-}sess}$ ID from the MSB of $K_{NRP\text{-}sess}$ ID received in the PROSE DIRECT LINK ESTABLISHMENT REQUEST message or PROSE DIRECT LINK REKEYING REQUEST message and the LSB of $K_{NRP\text{-}sess}$ ID included in the PROSE DIRECT LINK SECURITY MODE COMMAND message. The initiating UE shall use the $K_{NRP\text{-}sess}$ ID to identify the new security context.

The initiating UE shall set the source layer-2 ID and destination layer-2 ID as follows:
1) if the initiating UE is acting as a 5G ProSe layer-3 UE-to-network relay UE, and the EAP-AKA' based authentication method is used as specified in clause 6.3.3.3 of 3GPP TS 33.503 [34],
   the source layer-2 ID set to the source layer-2 ID used in PROSE AA MESSAGE TRANSPORT REQUEST message, and the destination layer-2 ID set to the the destination layer-2 ID used in PROSE AA MESSAGE TRANSPORT REQUEST message;
2) if the initiating UE is not acting as a 5G ProSe UE-to-network relay UE, and a 5G ProSe direct link authentication procedure has been initiated:
   the source layer-2 ID set to the source layer-2 ID used in PROSE DIRECT LINK AUTHENTICATION REQUEST message, and the destination layer-2 ID set to the the destination layer-2 ID used in PROSE DIRECT LINK AUTHENTICATION REQUEST message;
3) otherwise, self-assign a source layer-2 ID, and the destination layer-2 ID set to the source layer-2 ID in the PROSE DIRECT LINK ESTABLISHMENT REQUEST message.

NOTE 4: The UE implementation ensures that any value of the self-assigned source layer-2 ID is different from any other self-assigned source layer-2 ID(s) in use for 5G ProSe direct discovery as specified in clause 6.2.14, clause 6.2.15 and clause 8.2.1, and is different from any other provisioned destination layer-2 ID(s) as specified in clause 5.2.

NOTE 5: It is possible for the target UE to reuse the target UE's layer-2 ID used in previous 5G ProSe direct link with the same peer UE.

After the PROSE DIRECT LINK SECURITY MODE COMMAND message is generated, the initiating UE shall pass this message to the lower layers for transmission along with the source layer-2 ID and the destination layer-2 ID, NRPIK (or $K_{relay\text{-}int}$ when applicable), NRPEK (or $K_{relay\text{-}enc}$ when applicable) if applicable, $K_{NRP\text{-}sess}$ ID, the selected security algorithm as specified in TS 33.536 [37]; an indication of activation of the 5G ProSe direct signalling security protection for the 5G ProSe direct link with the new security context, if applicable and start timer T5089. The initiating UE shall not send a new PROSE DIRECT LINK SECURITY MODE COMMAND message to the same target UE while timer T5089 is running.

NOTE 6: The PROSE DIRECT LINK SECURITY MODE COMMAND message is integrity protected (and not ciphered) at the lower layer using the new security context.

If the 5G ProSe direct link security mode control procedure was triggered during a 5G ProSe direct link re-keying procedure, the initiating UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

Figure 10:
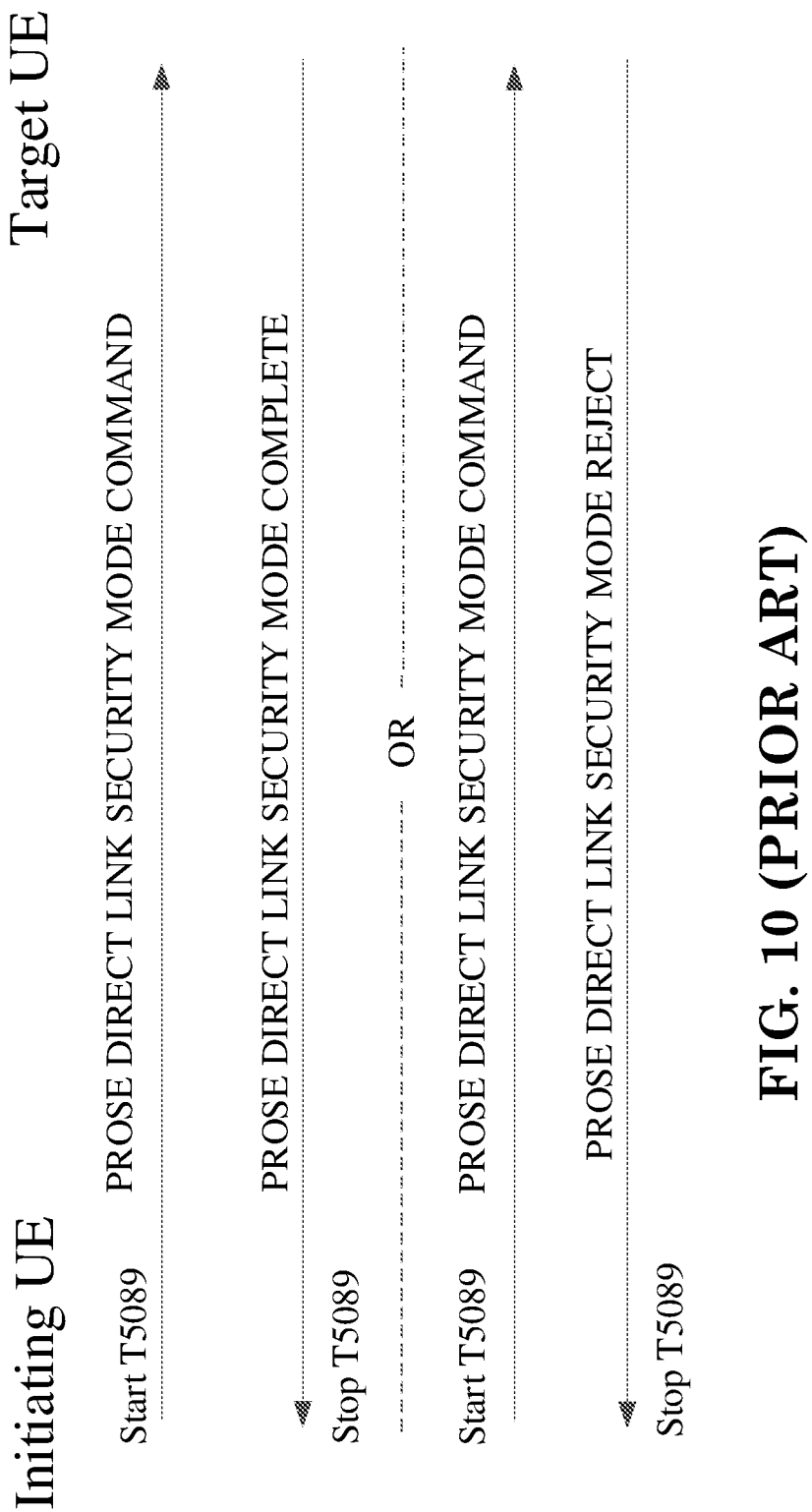
FIG. 10 is a reproduction of FIG. 7.2.10.2.1 of 3GPP TS 24.554 V17.4.0.

[FIG. 7.2.10.2.1 of 3GPP TS 24.554 V17.4.0, Entitled "5G ProSe Direct Link Security Mode Control Procedure", is Reproduced as FIG. 10]

7.2.10.3 5G ProSe Direct Link Security Mode Control Procedure Accepted by the Target UE Upon receipt of a PROSE DIRECT LINK SECURITY MODE COMMAND message, if a new assigned initiating UE's layer-2 ID is included and if the 5G ProSe direct link authentication procedure has not been executed, the target UE shall replace the original initiating UE's layer-2 ID with the new assigned initiating UE's layer-2 ID for 5G ProSe direct communication. The target UE shall check the selected security algorithms IE included in the PROSE DIRECT LINK SECURITY MODE COMMAND message. If "null integrity algorithm" is included in the selected security algorithms IE, the integrity protection is not offered for this 5G ProSe direct link and the signalling messages are transmitted unprotected. If "null ciphering algorithm" and an integrity algorithm other than "null integrity algorithm" are included in the selected algorithms IE, the ciphering protection is not offered for this 5G ProSe direct link and the signalling messages are transmitted unprotected. If the target UE's 5G ProSe direct signalling integrity protection policy is set to "Signalling integrity protection required", the target UE shall check the selected security algorithms IE in the PROSE DIRECT LINK SECURITY MODE COMMAND message does not include the null integrity protection algorithm. If the selected integrity protection algorithm is not the null integrity protection algorithm, the target UE shall:
   a) if the direct communication is not between the 5G ProSe remote UE and the 5G ProSe UE-to-network relay UE:
      1) derive $K_{NRP\text{-}sess}$ from $K_{NRP}$, Nonce_1 and Nonce_2 received in the PROSE DIRECT LINK SECURITY MODE COMMAND message as specified in 3GPP TS 33.536 [37];

2) derive NRPIK from $K_{NRP\text{-}sess}$ and the selected integrity algorithm as specified in 3GPP TS 33.536 [37]; and
3) if the $K_{NRP\text{-}sess}$ is derived and the selected ciphering protection algorithm is not the null ciphering protection algorithm, then the target UE shall derive NRPEK from $K_{NRP\text{-}sess}$ and the selected ciphering algorithm as specified in 3GPP TS 33.536 [37]; or b) if the direct communication is between the 5G ProSe remote UE and the 5G ProSe UE-to-network relay UE:
1) if the security procedure over control plane as specified in 3GPP TS 33.503 [34] is used, derive $K_{relay\text{-}sess}$ according to the security procedure over control plane, and derive $K_{relay\text{-}int}$ from $K_{relay\text{-}sess}$ and the selected integrity algorithm as specified in 3GPP TS 33.503 [34]. If the $K_{relay\text{-}sess}$ is derived and the selected ciphering protection algorithm is not the null ciphering protection algorithm, then the target UE shall derive $K_{relay\text{-}enc}$ from $K_{relay\text{-}sess}$ and the selected ciphering algorithm as specified in 3GPP TS 33.503 [34]; or
2) if security procedure over user plane as specified in 3GPP TS 33.503 [34] is used, derive $K_{NRP\text{-}sess}$ according to the security procedure over user plane, and derive NRPIK from $K_{NRP\text{-}sess}$ and the selected integrity algorithm as specified in 3GPP TS 33.503 [34]. If the $K_{NRP\text{-}sess}$ is derived and the selected ciphering protection algorithm is not the null ciphering protection algorithm, then the target UE shall derive NRPEK from $K_{NRP}$-sess and the selected ciphering algorithm as specified in 3GPP TS 33.503 [34].

The target UE shall determine whether or not the PROSE DIRECT LINK SECURITY MODE COMMAND message can be accepted by:
a) checking that the selected security algorithms in the PROSE DIRECT LINK SECURITY MODE COMMAND message does not include the null integrity protection algorithm if the target UE's 5G ProSe direct signalling integrity protection policy is set to "Signalling integrity protection required";
b) asking the lower layers to check the integrity of the PROSE DIRECT LINK SECURITY MODE COMMAND message using NRPIK (or $K_{relay\text{-}int}$ when applicable) and the selected integrity protection algorithm, if the selected integrity protection algorithm is not the null integrity protection algorithm;
c) checking that the received UE security capabilities have not been altered compared to the values that the target UE sent to the initiating UE in the PROSE DIRECT LINK ESTABLISHMENT REQUEST message or PROSE DIRECT LINK REKEYING REQUEST message;
d) if the 5G ProSe direct link security mode control procedure was triggered during a 5G ProSe direct link establishment procedure,
1) checking that the received UE 5G ProSe direct signalling security policy has not been altered compared to the values that the target UE sent to the initiating UE in the PROSE DIRECT LINK ESTABLISHMENT REQUEST message; and
2) checking that the LSB of $K_{NRP\text{-}sess}$ ID included in the PROSE DIRECT LINK SECURITY MODE COMMAND message are not set to the same value as those received from another UE in response to the target UE's PROSE DIRECT LINK ESTABLISHMENT REQUEST message; and e) if the 5G ProSe direct link security mode control procedure was triggered during a 5G ProSe direct link re-keying procedure and the integrity protection algorithm currently in use for the 5G ProSe direct link is different from the null integrity protection algorithm, checking that the selected security algorithms in the PROSE DIRECT LINK SECURITY MODE COMMAND message do not include the null integrity protection algorithm.

If the target UE did not include a $K_{NRP}$ ID in the PROSE DIRECT LINK ESTABLISHMENT REQUEST message, the target UE included a Re-authentication indication in the PROSE DIRECT LINK REKEYING REQUEST message or the initiating UE has chosen to derive:
a) a new $K_{NRP}$ if the direct communication is not between the 5G ProSe remote UE and the 5G ProSe UE-to-network relay UE; the target UE shall derive $K_{NRP}$ as specified in 3GPP TS 33.536 [37];
b) a new $K_{NRP}$, if the direct communication is between the 5G ProSe remote UE and the 5G ProSe UE-to-network relay UE and the security procedure over user plane as specified in 3GPP TS 33.503 [34] is used, the target UE shall derive $K_{NRP}$ as specified in 3GPP TS 33.536 [37]; or
c) a new $K_{NR\_ProSe}$, if the direct communication is between the 5G ProSe remote UE and the 5G ProSe UE-to-network relay UE and the security procedure over control plane as specified in 3GPP TS 33.503 [34] is used, the target UE shall derive $K_{NR\_ProSe}$ as specified in 3GPP TS 33.536 [37]; and the target UE shall choose the 2 LSBs of $K_{NRP}$ ID to ensure that the resultant $K_{NRP}$ ID will be unique in the target UE. The target UE shall form $K_{NRP}$ ID from the received MSB of $K_{NRP}$ ID and its chosen 2 LSBs of $K_{NRP}$ ID and shall store the complete $K_{NRP}$ ID with $K_{NRP}/K_{NR\_ProSe}$.

NOTE 1: If the direct communication is not between the 5G ProSe remote UE and the 5G ProSe UE-to-network relay UE, the $K_{NRP}$ ID holds the ID that corresponds to $K_{NRP}$. If the direct communication is between the 5G ProSe remote UE and the 5G ProSe UE-to-network relay UE, the $K_{NRP}$ ID holds the ID that corresponds to $K_{NRP}$ (if security procedure over user plane is used) or $K_{NR\_ProSe}$ (if security procedure over control plane is used).

If the GPI is included in the PROSE DIRECT LINK SECURITY MODE COMMAND message and the direct communication is between the 5G ProSe remote UE and the 5G ProSe UE-to-network relay UE, the target UE shall derive the UP-PRUK and obtain the UP-PRUK ID from the GPI, and use the UP-PRUK in deriving the $K_{NRP}$, according to the security procedure over user plane as specified in 3GPP TS 33.503 [34].

If the target UE accepts the PROSE DIRECT LINK SECURITY MODE COMMAND message, the target UE shall create a PROSE DIRECT LINK SECURITY MODE COMPLETE message. In this message, the target UE:
a) if the 5G ProSe direct link security mode control procedure was triggered during a 5G ProSe direct link establishment procedure:
1) shall include the PQFI and the corresponding PC5 QoS parameters if the 5G ProSe direct link is not for 5G ProSe direct communication between the 5G ProSe remote UE and the 5G ProSe UE-to-network relay UE; or
2) may include the PQFI and the corresponding PC5 QoS parameters if the 5G ProSe direct link is for 5G ProSe direct communication between 5G ProSe layer-3 remote UE and 5G ProSe layer-3 UE-to-network relay UE;

NOTE 2: The PQFI and the corresponding PC5 QoS parameters are not included if the 5G ProSe direct link is for 5G ProSe direct communication between 5G ProSe layer-2 remote UE and 5G ProSe layer-2 UE-to-network relay UE.

b) if IP communication is used and the 5G ProSe direct link security mode control procedure was triggered during a 5G ProSe direct link establishment procedure, shall include an IP address configuration IE set to one of the following values:
  1) "IPv6 router" if IPv6 address allocation mechanism is supported by the target UE, i.e., acting as an IPv6 router; or
  2) "address allocation not supported" if IPv6 address allocation mechanism is not supported by the target UE;

c) if IP communication is used, the IP address configuration IE is set to "address allocation not supported" and the 5G ProSe direct link security mode control procedure was triggered during a 5G ProSe direct link establishment procedure, shall include a link local IPv6 address IE formed locally based on IETF RFC 4862 [25];

d) if a new $K_{NRP}$ was derived or a new $K_{NRP}$ or $K_{NR\_ProSe}$ was received, shall include the 2 LSBs of $K_{NRP}$ ID; and e) if the 5G ProSe direct link security mode control procedure was triggered during a 5G ProSe direct link establishment procedure, shall include its UE 5G ProSe direct user plane security policy for this 5G ProSe direct link. In the case where the different ProSe services are mapped to the different 5G ProSe direct user plane security policies, when more than one ProSe identifier is included in the PROSE DIRECT LINK ESTABLISHMENT REQUEST message, each of the user plane security polices of those ProSe services shall be compatible, e.g., "user plane integrity protection not needed" and "user plane integrity protection required" are not compatible.

If the selected integrity protection algorithm is not the null integrity protection algorithm, the target UE shall form the $K_{NRP\text{-}sess}$ ID from the MSB of $K_{NRP\text{-}sess}$ ID it had sent in the PROSE DIRECT LINK ESTABLISHMENT REQUEST message or PROSE DIRECT LINK REKEYING REQUEST message and the LSB of $K_{NRP\text{-}sess}$ ID received in the PROSE DIRECT LINK SECURITY MODE COMMAND message. The target UE shall use the $K_{NRP\text{-}sess}$ ID to identify the new security context. After the PROSE DIRECT LINK SECURITY MODE COMPLETE message is generated, the target UE shall pass this message to the lower layers for transmission along with the target UE's layer-2 ID for 5G ProSe direct communication and the initiating UE's layer-2 ID for 5G ProSe direct communication, NRPIK (or $K_{relay\text{-}int}$ when applicable), NRPEK (or $K_{relay\text{-}enc}$ when applicable) if applicable, $K_{NRP\text{-}sess}$ ID, the selected security algorithm as specified in 3GPP TS 33.536 [37] and an indication of activation of the 5G ProSe direct signalling security protection for the 5G ProSe direct link with the new security context, if applicable.

NOTE 3: The PROSE DIRECT LINK SECURITY MODE COMPLETE message and further 5G ProSe direct signalling messages are integrity protected and ciphered (if applicable) at the lower layer using the new security context.

If the 5G ProSe direct link security mode control procedure was triggered during a 5G ProSe direct link re-keying procedure, the target UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

7.2.10.4 5G ProSe Direct Link Security Mode Control Procedure Completion by the Initiating UE Upon receiving a PROSE DIRECT LINK SECURITY MODE COMPLETE message, the initiating UE shall stop timer T5089. If the selected integrity protection algorithm is not the null integrity protection algorithm, the UE checks the integrity of the PROSE DIRECT LINK SECURITY MODE COMPLETE message. If the integrity check passes, the initiating UE shall then continue the procedure which triggered the 5G ProSe direct link security mode control procedure. If the selected integrity protection algorithm is the null integrity protection algorithm, the UE continues the procedure without checking the integrity protection.

After receiving the PROSE DIRECT LINK SECURITY MODE COMPLETE message, the initiating UE shall delete the old security context it has for the target UE, if any.

7.2.10.5 5G ProSe Direct Link Security Mode Control Procedure not Accepted by the Target UE If the PROSE DIRECT LINK SECURITY MODE COMMAND message cannot be accepted, the target UE shall send a PROSE DIRECT LINK SECURITY MODE REJECT message and the target UE shall abort the ongoing procedure that triggered the initiation of the 5G ProSe direct link security mode control procedure unless the ongoing procedure is a 5G ProSe direct link establishment procedure and the Target user info is not included in the PROSE DIRECT LINK ESTABLISHMENT REQUEST message. The PROSE DIRECT LINK SECURITY MODE REJECT message contains a PC5 signalling protocol cause IE indicating one of the following cause values:
  #5: lack of resources for 5G ProSe direct link;
  #7: integrity failure;
  #8: UE security capabilities mismatch;
  #9: LSB of $K_{NRP\text{-}sess}$ ID conflict;
  #10: UE PC5 unicast signalling security policy mismatch;
  #14: Authentication synchronisation error; or
  #111: protocol error, unspecified.

If this 5G ProSe direct link security mode control procedure is triggered during the 5G ProSe direct link establishment procedure and the implementation-specific maximum number of established NR 5G ProSe direct links has been reached, then the target UE shall send a PROSE DIRECT LINK SECURITY MODE REJECT message containing PC5 signalling protocol cause value #5"lack of resources for 5G ProSe direct link".

If the PROSE DIRECT LINK SECURITY MODE COMMAND message cannot be accepted because the 5G ProSe direct link security mode control procedure was triggered during a 5G ProSe direct link establishment procedure, that the selected security algorithms in the PROSE DIRECT LINK SECURITY MODE COMMAND message included the null integrity protection algorithm and the target UE's 5G ProSe direct signalling integrity protection policy is set to "Signalling integrity protection required", the target UE shall include PC5 signalling protocol cause #10 "UE PC5 unicast signalling security policy mismatch" in the PROSE DIRECT LINK SECURITY MODE REJECT message.

If the PROSE DIRECT LINK SECURITY MODE COMMAND message cannot be accepted because the 5G ProSe direct link security mode control procedure was triggered during a 5G ProSe direct link re-keying procedure, the integrity protection algorithm currently in use for the 5G ProSe direct link is different from the null integrity protection algorithm and the selected security algorithms in the PROSE DIRECT LINK SECURITY MODE COMMAND message include the null integrity protection algorithm, the target UE, the target UE shall include PC5 signalling protocol cause #10 "UE PC5 unicast signalling security policy mismatch" in the PROSE DIRECT LINK SECURITY MODE REJECT message.

If the target UE detects that the received UE security capabilities IE in the PROSE DIRECT LINK SECURITY MODE COMMAND message has been altered compared to the latest values that the target UE sent to the initiating UE in the PROSE DIRECT LINK ESTABLISHMENT REQUEST message or PROSE DIRECT LINK REKEYING REQUEST message, the target UE shall include PC5 signalling protocol cause #8"UE security capabilities mismatch" in the PROSE DIRECT LINK SECURITY MODE REJECT message.

If the target UE detects that the LSB of $K_{NRP-sess}$ ID included in the PROSE DIRECT LINK SECURITY MODE COMMAND message are set to the same value as those received from another UE in response to the target UE's PROSE DIRECT LINK ESTABLISHMENT REQUEST message, the target UE shall include PC5 signalling protocol cause #9 "LSB of $K_{NRP-sess}$ ID conflict" in the PROSE DIRECT LINK SECURITY MODE REJECT message.

If the 5G ProSe direct link security mode control procedure is for direct communication between the 5G ProSe remote UE and the 5G ProSe UE-to-network relay UE, and the PROSE DIRECT LINK SECURITY MODE COMMAND message cannot be accepted due to a synchronisation error when processing the authentication vector contained in the GPI sent by the 5G ProSe UE-to-network relay UE to the 5G ProSe remote UE, if any, the target UE shall include PC5 signalling protocol cause #14 "Authentication synchronisation error" in the PROSE DIRECT LINK SECURITY MODE REJECT message and shall include the RAND and AUTS parameters in the PROSE DIRECT LINK SECURITY MODE REJECT message.

After the PROSE DIRECT LINK SECURITY MODE REJECT message is generated, the target UE shall pass this message to the lower layers for transmission along with the initiating UE's layer-2 ID for 5G ProSe direct communication and the target UE's layer-2 ID for 5G ProSe direct communication.

Upon receipt of the PROSE DIRECT LINK SECURITY MODE REJECT message, the initiating UE shall stop timer T5089, provide an indication to the lower layer of deactivation of the 5G ProSe direct security protection and deletion of security context for the 5G ProSe direct link, if applicable and:

a) if the PC5 signalling protocol cause IE in the PROSE DIRECT LINK SECURITY MODE REJECT message is set to #9 "LSB of $K_{NRP-sess}$ ID conflict", retransmit the PROSE DIRECT LINK SECURITY MODE COMMAND message with a different value for the LSB of $K_{NRP-sess}$ ID and restart timer T5089;

b) if the PC5 signalling protocol cause IE in the PROSE DIRECT LINK SECURITY MODE REJECT message is set to #14 "Authentication synchronisation error", the message contained a RAND and an AUTS, and the 5G ProSe direct link security mode control procedure is for direct communication between the 5G ProSe remote UE and the 5G ProSe UE-to-network relay UE, may fetch a fresh GPI from the PKMF by sending a Key Request message including RAND and AUTS as specified in 3GPP TS 33.503 [34]; or c) if the PC5 signalling protocol cause IE is set to the value other than #9 "LSB of $K_{NRP-sess}$ ID conflict" and other than #14"Authentication synchronisation error", abort the ongoing procedure that triggered the initiation of the 5G ProSe direct link security mode control procedure.

7.2.10.6 Abnormal Cases 7.2.10.6.1 Abnormal Cases at the Initiating UE a) Timer T5089 expires.

The initiating UE shall retransmit the PROSE DIRECT LINK SECURITY MODE COMMAND message and restart timer T5089. After reaching the maximum number of allowed retransmissions, the initiating UE shall abort the 5G ProSe direct link security mode control procedure, shall provide an indication to the lower layer of deactivation of the 5G ProSe direct security protection and deletion of security context for the 5G ProSe direct link, if applicable and shall abort the ongoing procedure that triggered the initiation of the 5G ProSe direct link security mode control procedure.

NOTE 1: The maximum number of allowed retransmissions is UE implementation specific.

b) The need to use this 5G ProSe direct link no longer exists before the 5G ProSe direct link security mode control procedure is completed.

The initiating UE shall abort the procedure, shall provide an indication to the lower layer of deactivation of the 5G ProSe direct security protection and deletion of security context for the 5G ProSe direct link, if applicable and shall abort the ongoing procedure that triggered the initiation of the 5G ProSe direct link security mode control procedure.

c) If PROSE DIRECT LINK MODIFICATION REQUEST message or PROSE DIRECT LINK IDENTIFIER UPDATE REQUEST message is received when the timer T5089 is running, the initiating UE shall discard the PROSE DIRECT LINK MODIFICATION REQUEST message or PROSE DIRECT LINK IDENTIFIER UPDATE REQUEST message.

d) If PROSE DIRECT LINK RELEASE REQUEST message is received when the timer T5089 is running, the initiating UE shall stop the timer T5089, abort the 5G ProSe direct link security mode control procedure and proceed with the 5G ProSe direct link release procedure.

NOTE 2: The abnormal cases as described in bullet c) or d) only happen when the 5G ProSe direct link security mode control procedure is used to establish security between two UEs during a 5G ProSe direct link re-keying procedure.

7.2.11 5G ProSe direct link re-keying procedure 7.2.11.1 General

The purpose of the 5G ProSe direct link re-keying procedure is to derive:

a) a new $K_{NRP-sess}$ and, optionally, a new $K_{NRP}$ for an existing 5G ProSe direct link that is not between 5G ProSe remote UE and 5G ProSe UE-to-network relay UE;

b) a new $K_{NRP-sess}$ for an existing 5G ProSe direct link that is between 5G ProSe remote UE and 5G ProSe UE-to-network relay UE when the security procedure over user plane as specified in 3GPP TS 33.503 [34] is used; or c) a new $K_{relay\text{-}sess}$ for an existing 5G ProSe direct link that is between 5G ProSe remote UE and 5G ProSe UE-to-network relay UE when the security procedure over control plane as specified in 3GPP TS 33.503 [34] is used.

The UE sending the PROSE DIRECT LINK REKEYING REQUEST message is called the "initiating UE" and the other UE is called the "target UE".

NOTE 1: There is no benefit in performing the 5G ProSe direct link re-keying procedure when using the null integrity protection algorithm, hence it is recommended not to trigger it when using the null integrity protection algorithm.

7.2.11.2 5G ProSe direct link re-keying procedure initiation by the initiating UE The initiating UE shall meet the following pre-condition before initiating the 5G ProSe direct link re-keying procedure:

a) there is a 5G ProSe direct link between the initiating UE and the target UE; and
   1) if the session key $K_{NRP}$-sess or $K_{relay\text{-}sess}$ (see clause 7.2.11.1) used to protect 5G ProSe direct link needs to be refreshed and neither timer T5089 nor T5091 are running;
   2) if the UE wants to refresh $K_{NRP}$, when the 5G ProSe direct link is not between 5G ProSe remote UE and 5G ProSe UE-to-network relay UE, and neither timer T5089 nor T5091 are running; or
   3) if the lower layers indicate that a 5G ProSe direct link re-keying procedure needs to be performed.

In order to initiate the 5G ProSe direct link re-keying procedure, the initiating UE shall create a PROSE DIRECT LINK REKEYING REQUEST message. In this message, the initiating UE:

a) shall include the Key establishment information container IE if the 5G ProSe direct link is not for direct communication between the 5G ProSe remote UE and the 5G ProSe UE-to-network relay UE and the null integrity protection algorithm is not in use;

NOTE 1: The key establishment information container is provided by upper layers.

b) shall include a Nonce_1 IE set to the 128-bit nonce value generated by the initiating UE for the purpose of session key refresh over this 5G ProSe direct link if the null integrity protection algorithm is not in use;

c) shall include its UE security capabilities indicating the list of algorithms that the initiating UE supports for the re-keying of this 5G ProSe direct link;

d) shall include the MSB of $K_{NRP}$-sess ID or the MSB of $K_{relay\text{-}sess}$ ID (see clause 7.2.11.1) chosen by the initiating UE as specified in 3GPP TS 33.503 [34] if the null integrity protection algorithm is not in use;

NOTE 2: The MSB of $K_{NRP\text{-}sess}$ ID IE in the PROSE DIRECT LINK REKEYING REQUEST message is used to hold the value of MSB of $K_{NRP\text{-}sess}$ ID or MSB of $K_{relay\text{-}sess}$ ID.

e) may include a Re-authentication indication if the initiating UE wants to derive a new $K_{NRP}$ and the 5G ProSe direct link re-keying procedure is not between the 5G ProSe remote UE and the 5G ProSe UE-to-network relay UE;

NOTE 3: When the 5G ProSe direct link re-keying procedure is between the 5G ProSe remote UE and the 5G ProSe UE-to-network relay UE, the Re-authentication indication is not included because a new $K_{NRP}$ is always derived according to the security procedure over user plane or the security procedure over control plane as specified in 3GPP TS 33.503 [34].

f) shall include the User security key ID IE set to:
   1) UP-PRUK ID of the initiating UE if:
      i) the UE has a valid UP-PRUK;
      ii) the 5G ProSe direct link re-keying procedure is between the 5G ProSe remote UE and the 5G ProSe UE-to-network relay UE; and
      iii) the security procedure over user plane as specified in 3GPP TS 33.503 [34] is used; or
   2) CP-PRUK ID of the initiating UE that is associated with the relay service code of the target UE if:
      i) the UE has a valid CP-PRUK associated with the relay service code of the target UE;
      ii) the 5G ProSe direct link re-keying procedure is between the 5G ProSe remote UE and the 5G ProSe UE-to-network relay UE; and
      iii) the security procedure over control plane as specified in 3GPP TS 33.503 [34] is used; and g) shall include the HPLMN ID of the 5G ProSe Remote UE if the UP-PRUK ID is included and is not in NAI format (see 3GPP TS 33.503 [34]).

After the PROSE DIRECT LINK REKEYING REQUEST message is generated, the initiating UE shall pass this message to the lower layers for transmission along with the initiating UE's layer-2 ID for unicast communication and the target UE's layer-2 ID for unicast communication and start timer T5091. The UE shall not send a new PROSE DIRECT LINK REKEYING REQUEST message to the same target UE while timer T5091 is running.

NOTE 4: In order to ensure successful 5G ProSe direct link re-keying, T5091 should be set to a value larger than the sum of T5092 and T5089.

Figure 11:
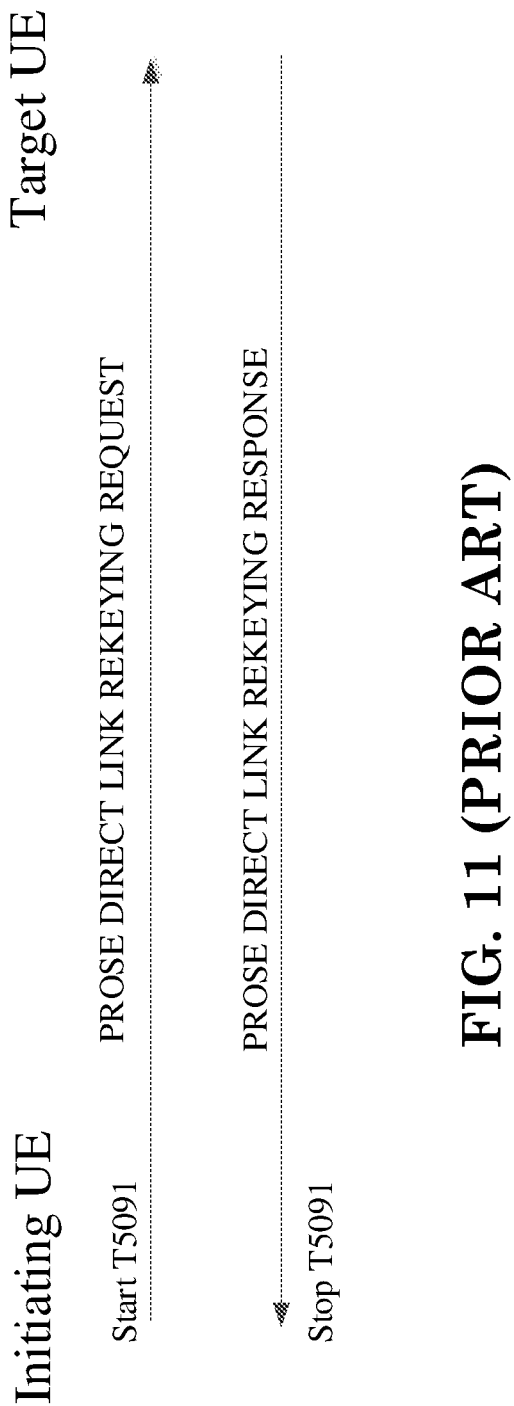
FIG. 11 is a reproduction of FIG. 7.2.11.2.1 of 3GPP TS 24.554 V17.4.0.

[FIG. 7.2.11.2.1 of 3GPP TS 24.554 V17.4.0, entitled "5G ProSe direct link re-keying procedure", is reproduced as FIG. 11]

7.2.11.3 5G ProSe Direct Link Re-Keying Procedure Accepted by the Target UE

Upon receipt of a PROSE DIRECT LINK REKEYING REQUEST message, if the PROSE DIRECT LINK REKEYING REQUEST message includes a Re-authentication indication, the target UE shall derive a new $K_{NRP}$. This may require performing one or more 5G ProSe direct link authentication procedures as specified in clause 7.2.12.

NOTE: How many times the 5G ProSe direct link authentication procedure needs to be performed to derive a new $K_{NRP}$ depends on the authentication method used.

Then the target UE shall initiate a 5G ProSe direct link security mode control procedure as specified in in clause 7.2.10, where if the 5G ProSe direct link re-keying procedure is sent from the 5G ProSe remote UE to the 5G ProSe UE-to-network relay UE, the target UE shall proceed to establish a new $K_{NRP}$ or $K_{NR\_ProSe}$ according to the security procedure over user plane or the security procedure over control plane, respectively, as specified in 3GPP TS 33.503 [34]. Upon successful completion of the 5G ProSe direct link security mode control procedure, the target UE shall create a PROSE DIRECT LINK REKEYING RESPONSE message.

After the PROSE DIRECT LINK REKEYING RESPONSE message is generated, the target UE shall pass this message to the lower layers for transmission along with the initiating UE's layer-2 ID for unicast communication and the target UE's layer-2 ID for unicast communication.

7.2.11.4 5G ProSe Direct Link Re-Keying Procedure Completion by the Initiating UE Upon receipt of the PROSE DIRECT LINK REKEYING RESPONSE message, the initiating UE shall stop timer T5091 and check the integrity of the PROSE DIRECT LINK REKEYING RESPONSE message using the new NRPIK. After receiving the PROSE DIRECT LINK REKEYING RESPONSE message, the initiating UE shall delete the old security context it has for the target UE.

7.2.11.5 Abnormal Cases at the Initiating UE

The following abnormal cases can be identified:

a) Timer T5091 expires.

The initiating UE shall retransmit the PROSE DIRECT LINK REKEYING REQUEST message and restart timer T5091. After reaching the maximum number of allowed retransmissions, the initiating UE shall abort the 5G ProSe direct link re-keying procedure, shall provide an indication of deactivation of the PC5 unicast security protection and deletion of security context for the 5G ProSe direct link to the lower layer, if applicable, along with the initiating UE's layer-2 ID for unicast communication and the target UE's layer-2 ID for unicast communication and may initiate the 5G ProSe direct link release procedure.

NOTE: The maximum number of allowed retransmissions is UE implementation specific.

b) The need to use this 5G ProSe direct link no longer exists before the 5G ProSe direct link re-keying procedure is completed.

The initiating UE shall abort the procedure and shall provide an indication of deactivation of the PC5 unicast security protection and deletion of security context for the 5G ProSe direct link to the lower layer, if applicable, along with the initiating UE's layer-2 ID for unicast communication and the target UE's layer-2 ID for unicast communication.

c) For the same 5G ProSe direct link, if the initiating UE receives a PROSE DIRECT LINK IDENTIFIER UPDATE REQUEST message after initiating the 5G ProSe direct link re-keying procedure, the initiating UE shall stop the timer T5091, abort the 5G ProSe direct link re-keying procedure and proceed with the 5G ProSe direct link identifier update procedure.

7.2.12 5G ProSe Direct Link Authentication Procedure

7.2.12.1 General

The 5G ProSe direct link authentication procedure is used to perform mutual authentication of UEs establishing a 5G ProSe direct link and to derive a new $K_{NRP}$ shared between two UEs during a 5G ProSe direct link establishment procedure or a 5G ProSe direct link re-keying procedure. After successful completion of the 5G ProSe direct link authentication procedure, the new $K_{NRP}$ is used for security establishment during the 5G ProSe direct link security mode control procedure as specified in clause 7.2.10. The UE sending the PROSE DIRECT LINK AUTHENTICATION REQUEST message is called the "initiating UE" and the other UE is called the "target UE".

NOTE: The 5G ProSe direct link authentication procedure is applicable for neither 5G ProSe layer-3 UE-to-network relay nor 5G ProSe layer-2 UE-to-network relay.

7.2.12.2 5G ProSe Direct Link Authentication Procedure Initiation by the Initiating UE The initiating UE shall meet one of the following preconditions when establishing the non-null signalling integrity protection based on the decision of the initiating UE, before initiating the 5G ProSe direct link authentication procedure:

a) the target UE has initiated a 5G ProSe direct link establishment procedure toward the initiating UE by sending a PROSE DIRECT LINK ESTABLISHMENT REQUEST message and:

1) the PROSE DIRECT LINK ESTABLISHMENT REQUEST message:

i) includes a target user info IE which includes the application layer ID of the initiating UE; or ii) does not include a target user info IE and the initiating UE is interested in the ProSe service identified by the ProSe identifier in the PROSE DIRECT LINK ESTABLISHMENT REQUEST message; and 2) the $K_{NRP}$ ID is not included in the PROSE DIRECT LINK ESTABLISHMENT REQUEST message or the initiating UE does not have an existing $K_{NRP}$ for the $K_{NRP}$ ID included in PROSE DIRECT LINK ESTABLISHMENT REQUEST message or the initiating UE derives a new $K_{NRP}$; or b) the target UE has initiated a 5G ProSe direct link re-keying procedure toward the initiating UE by sending a PROSE DIRECT LINK REKEYING REQUEST message and the PROSE DIRECT LINK REKEYING REQUEST message includes a Re-authentication indication.

In order to initiate the 5G ProSe direct link authentication procedure, the initiating UE shall create a PROSE DIRECT LINK AUTHENTICATION REQUEST message. In this message, the initiating UE:

a) shall include the key establishment information container IE.

NOTE 1: The Key establishment information container is provided by upper layers.

The initiating UE shall self-assign a source layer-2 ID, and the destination layer-2 ID set to the source layer-2 ID in the PROSE DIRECT LINK ESTABLISHMENT REQUEST message.

NOTE 2: The UE implementation ensures that any value of the self-assigned source layer-2 ID is different from any other self-assigned source layer-2 ID(s) in use for 5G ProSe direct discovery as specified in clause 6.2.14, clause 6.2.15 and clause 8.2.1 and is different from any other provisioned destination layer-2 ID(s) as specified in clause 5.2.

NOTE 3: It is possible for the target UE to reuse the target UE's layer-2 ID used in previous 5G ProSe direct link with the same peer UE.

After the PROSE DIRECT LINK AUTHENTICATION REQUEST message is generated, the initiating UE shall pass this message to the lower layers for transmission along with the initiating UE's layer-2 ID for unicast communication and the target UE's layer-2 ID for unicast communication. The initiating UE shall start timer T5092. The UE shall not send a new PROSE DIRECT LINK AUTHENTICATION REQUEST message to the same target UE while timer T5092 is running.

Figure 12:
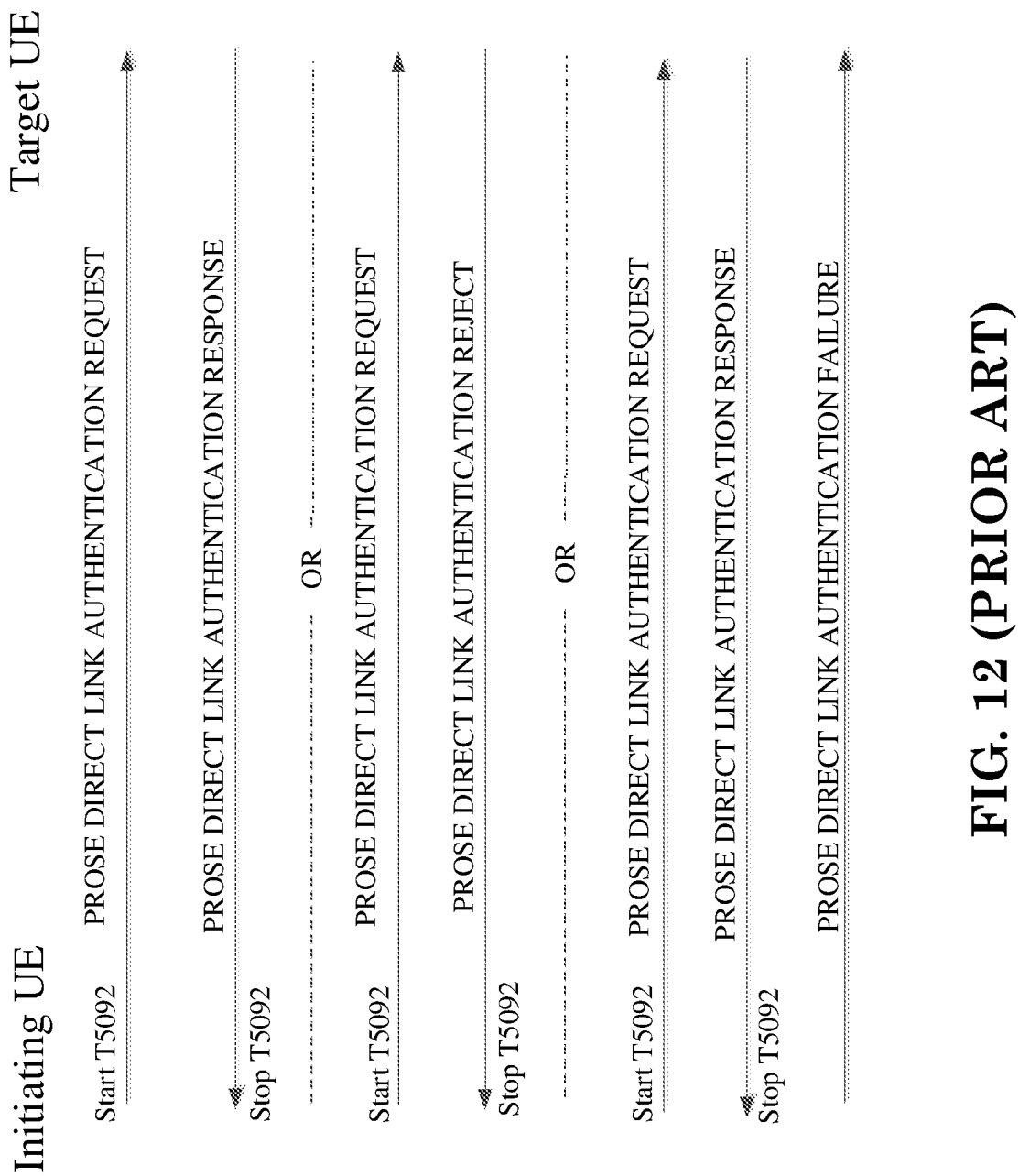
FIG. 12 is a reproduction of FIG. 7.2.12.2.1 of 3GPP TS 24.554 V17.4.0.

[FIG. 7.2.12.2.1 of 3GPP TS 24.554 V17.4.0, Entitled "5G ProSe Direct Link Authentication Procedure", is Reproduced as FIG. 12]

7.2.12.3 5G ProSe Direct Link Authentication Procedure Accepted by the Target UE Upon receipt of a PROSE DIRECT LINK AUTHENTICATION REQUEST message, if a new assigned initiating UE's layer-2 ID is included, the target UE shall replace the original initiating UE's layer-2 ID with the new assigned initiating UE's layer-2 ID for unicast communication. If the target UE determines that the PROSE DIRECT LINK AUTHENTICATION REQUEST message can be accepted, the target UE shall create a PROSE DIRECT LINK AUTHENTICATION RESPONSE message. The target UE shall check if the number of established 5G ProSe direct links is less than the implementation-specific maximum number of established NR 5G ProSe direct links allowed in the UE at a time. In this message, the target UE:
  a) shall include the Key establishment information container IE.
  NOTE: The key establishment information container is provided by upper layers.

After the PROSE DIRECT LINK AUTHENTICATION RESPONSE message is generated, the target UE shall pass this message to the lower layers for transmission along with the target UE's layer-2 ID for unicast communication and the initiating UE's layer-2 ID for unicast communication.

7.2.12.4 5G ProSe Direct Link Authentication Procedure Completion by the Initiating UE Upon receiving a PROSE DIRECT LINK AUTHENTICATION RESPONSE message, if the initiating UE determines that the PROSE DIRECT LINK AUTHENTICATION RESPONSE message can be accepted, the initiating UE shall stop timer T5092.
  NOTE: When the initiating UE derives the new $K_{NRP}$ during the 5G ProSe direct link authentication procedure depends on the authentication method in use.

7.2.12.5 5G ProSe Direct Link Authentication Procedure not Accepted by the Target UE If the PROSE DIRECT LINK AUTHENTICATION REQUEST message cannot be accepted, the target UE shall create a PROSE DIRECT LINK AUTHENTICATION REJECT message. In this message, the target UE shall include a PC5 signalling protocol cause IE indicating one of the following cause values:
  #5: lack of resources for 5G ProSe direct link;
  #6: authentication failure.

If this 5G ProSe direct link authentication procedure is triggered during the 5G ProSe direct link establishment procedure and the implementation-specific maximum number of established NR 5G ProSe direct links has been reached, then the target UE shall send a PROSE DIRECT LINK AUTHENTICATION REJECT message containing PC5 signalling protocol cause value #5 "lack of resources for 5G ProSe direct link".

After the PROSE DIRECT LINK AUTHENTICATION REJECT message is generated, the target UE shall pass this message to the lower layers for transmission along with the initiating UE's layer-2 ID for unicast communication and the target UE's layer-2 ID for unicast communication. The target UE shall abort the ongoing procedure that triggered the initiation of the 5G ProSe direct link authentication procedure if the ongoing procedure is the 5G ProSe direct link establishment procedure and the target user info is included in the PROSE DIRECT LINK ESTABLISHMENT REQUEST message.

Upon receipt of the PROSE DIRECT LINK AUTHENTICATION REJECT message, the initiating UE shall stop timer T5092 and abort the ongoing procedure that triggered the initiation of the 5G ProSe direct link authentication procedure.

7.2.12.6 5G ProSe Direct Link Authentication Procedure not Accepted by the Initiating UE If the PROSE DIRECT LINK AUTHENTICATION RESPONSE message cannot be accepted, the initiating UE shall stop timer T5092 and create a PROSE DIRECT LINK AUTHENTICATION FAILURE message. In this message, the initiating UE may include the Key establishment information container IE if provided by upper layers.

After the PROSE DIRECT LINK AUTHENTICATION FAILURE message is generated, the initiating UE shall pass this message to the lower layers for transmission along with the initiating UE's layer-2 ID for unicast communication and the target UE's layer-2 ID for unicast communication. The initiating UE shall abort the ongoing procedure that triggered the initiation of the 5G ProSe direct link authentication procedure.

Upon receipt of the PROSE DIRECT LINK AUTHENTICATION FAILURE message, the target UE shall abort the ongoing procedure that triggered the initiation of the 5G ProSe direct link authentication procedure and shall indicate to upper layers that authentication has failed.

7.2.12.7 Abnormal Cases 7.2.12.7.1 Abnormal Cases at the Initiating UE
  a) Timer T5092 expires.
    The initiating UE shall retransmit the PROSE DIRECT LINK AUTHENTICATION REQUEST message and restart timer T5092. After reaching the maximum number of allowed retransmissions, the initiating UE shall abort the 5G ProSe direct link authentication procedure and shall abort the ongoing procedure that triggered the initiation of the 5G ProSe direct link authentication procedure.
  NOTE 1: The maximum number of allowed retransmissions is UE implementation specific.
  b) The need to use this 5G ProSe direct link no longer exists before the 5G ProSe direct link authentication procedure is completed.
    The initiating UE shall abort the 5G ProSe direct link authentication procedure and shall abort the ongoing procedure that triggered the initiation of the 5G ProSe direct link authentication procedure.
  c) For the same 5G ProSe direct link, if the initiating UE receives a PROSE DIRECT LINK RELEASE REQUEST message during the 5G ProSe direct link authentication procedure, the initiating UE shall stop all running timers for this 5G ProSe direct link, abort the 5G ProSe direct link authentication procedure and proceed with the 5G ProSe direct link release procedure.
  NOTE 2: The abnormal cases as described in bullet c) only happens when the 5G ProSe direct link authentication procedure is used to perform mutual authentication of UEs during a 5G ProSe direct link re-keying procedure.

3GPP TS 23.304 describes support of layer-2 link establishment for unicast mode of ProSe Direct communication over PC5 reference point, while 3GPP TS 24.554 specifies the stage 3 details on the layer-2 link establishment (or called 5G ProSe direct link establishment as discussed in 3GPP TS 24.554). For example, there are UE1 and UE2 would like to perform unicast mode sidelink communication with each other. According to 3GPP TS 23.304 and 3GPP TS 24.554, UE1 sends a direct communication request message to UE2 for request of establishing a unicast link. UE2 then sends a security mode control command message to UE1 for request of establishing security context (including e.g. security keys and algorithm) for the unicast link.

In response to reception of the security mode control command message, UE1 responds a security mode control complete message to UE2 for completing the security context establishment. Finally, UE2 responds a direct communication accept message to UE1 for completing the direct link establishment. After the unicast link is established, UE1 may initiate the direct link re-keying procedure for establishing a new security context for the unicast link. UE1 may send a direct link re-keying request message to UE2 in the direct link re-keying procedure. In response to reception of the direct link re-keying request message, UE2 may initiate (a direct link authentication procedure and) a direct link security mode control procedure. UE2 may send a direct link security mode command message to UE1, and UE1 may respond a direct link security mode complete message to UE2. And then, UE2 may respond a direct link re-keying response message to UE1 for completing the direct link re-keying procedure. UE2 may start applying with the new security context after the direct link security mode command message is passed to lower layer for transmission, while UE1 may start applying with the new security context after the direct link security mode complete message is passed to lower layer for transmission.

It is possible that UE1 may initiate the direct link identifier update procedure (due to, for example, change of UE1's application layer ID, expiry of privacy timer of UE1's layer-2 ID, or etc.) after the direct link re-keying procedure is initiated (by UE1). In the direct link identifier update procedure, UE1 could send a direct link identifier update request message to UE2. According to Section 7.2.10.6.1 of 3GPP TS 24.554, UE2 just discards the direct link identifier update request message if UE2 is performing the direct link security mode control procedure (i.e. the timer T5089 is running). From resource efficiency point of view, it would be better for UE1 to postpone the direct link identifier update procedure till the direct link re-keying procedure is completed (i.e. when the timer T5091 is not running) so that the radio resource used for the transmission of the direct link identifier update request message to be discarded can be saved. Similarly, UE2 also discards the direct link modification request message if UE2 is performing the direct link security mode control procedure (i.e. the timer T5089 is running). Thus, it is also beneficial for UE1 to postpone the direct link modification procedure till the direct link re-keying procedure is completed.

The solution could be illustrated in following example of text proposal for 3GPP TS 24.554:

---
7.2.3.2 5G ProSe direct link modification procedure initiated by initiating UE

---

The initiating UE shall meet the following pre-conditions before initiating this procedure for adding a new ProSe application to the existing 5G ProSe direct link:
a) there is a 5G ProSe direct link between the initiating UE and the target UE;
b) the pair of application layer IDs and the network layer protocol of this 5G ProSe direct link are identical to those required by the application layer in the initiating UE for this ProSe application;
c) the security policy corresponding to the ProSe identifier is aligned with the security policy of the existing 5G ProSe direct link; and
d) the timer T5091 is not running.
[. . .]

7.2.4.2 5G ProSe direct link identifier update procedure initiation by initiating UE

---

The initiating UE shall initiate the procedure if:
a) the initiating UE receives a request from upper layers to change the application layer ID and there is an existing 5G ProSe direct link associated with this application layer ID; or
b) the privacy timer (see clause 5.2.4) of the initiating UE's layer-2 ID expires for an existing 5G ProSe direct link.
The initiating UE shall meet the following pre-conditions before initiating this procedure:
a) the timer T5091 is not running.
[. . .]

The solution could be alternatively illustrated in following example of text proposal for 3GPP TS 24.554:

---
7.2.3.2 5G ProSe direct link modification procedure initiated by initiating UE

---

The initiating UE shall meet the following pre-conditions before initiating this procedure for adding a new ProSe application to the existing 5G ProSe direct link:
a) there is a 5G ProSe direct link between the initiating UE and the target UE;
b) the pair of application layer IDs and the network layer protocol of this 5G ProSe direct link are identical to those required by the application layer in the initiating UE for this ProSe application; and
c) the security policy corresponding to the ProSe identifier is aligned with the security policy of the existing 5G ProSe direct link.
NOTE 1: The initiating UE shall postpone this procedure until the timer T5091 is not running.
[. . .]

7.2.4.2 5G ProSe direct link identifier update procedure initiation by initiating UE

---

The initiating UE shall initiate the procedure if:
a) the initiating UE receives a request from upper layers to change the application layer ID and there is an existing 5G ProSe direct link associated with this application layer ID; or
b) the privacy timer (see clause 5.2.4) of the initiating UE's layer-2 ID expires for an existing 5G ProSe direct link.
NOTE 1: The initiating UE shall postpone this procedure until the timer T5091 is not running.
[. . .]

On the other hand, it is also possible that UE2 may initiate the direct link identifier update procedure (due to e.g. change of UE2's application layer ID, expiry of privacy timer of UE2's layer-2 ID, or etc.) after the direct link security mode control procedure is initiated (by UE2). It is noted that this direct link security mode control procedure is triggered by the direct link re-keying procedure initiated by UE1. In the direct link security mode control procedure, UE2 sends a direct link security mode command message to UE1 and receives a direct link security mode complete message from UE1. In the direct link identifier update procedure, UE2 sends a direct link identifier update request message to UE1.

According to Section 7.2.11.5 of 3GPP TS 24.554, in response to reception of the direct link identifier update request message from UE2, UE1 aborts the direct link re-keying procedure and then proceeds with the direct link identifier update procedure (initiated by UE2). Aborting the direct link re-keying procedure would imply that UE1 may not apply with the new security context. Thus, UE1 would apply with the old security context and proceed the direct link identifier update procedure. However, from UE2 perspective, the direct link security mode control procedure could be still completed even if the direct link identifier update procedure is initiated. In this situation, UE2 would apply with the new security context and proceed the direct link identifier update procedure. To this end, since the signalling messages of the direct link identifier update procedure are sent with ciphered protection, the direct link identifier update procedure with security context not unaligned between two UEs cannot be completed and thus the unicast link may be released. To address this issue, it would be better for UE2 to postpone the direct link identifier update procedure till the direct link re-keying procedure is completed (i.e. the direct link identifier update request message could be sent to UE1 after UE2 sending the direct link re-keying response message to UE1).

Figure 13:
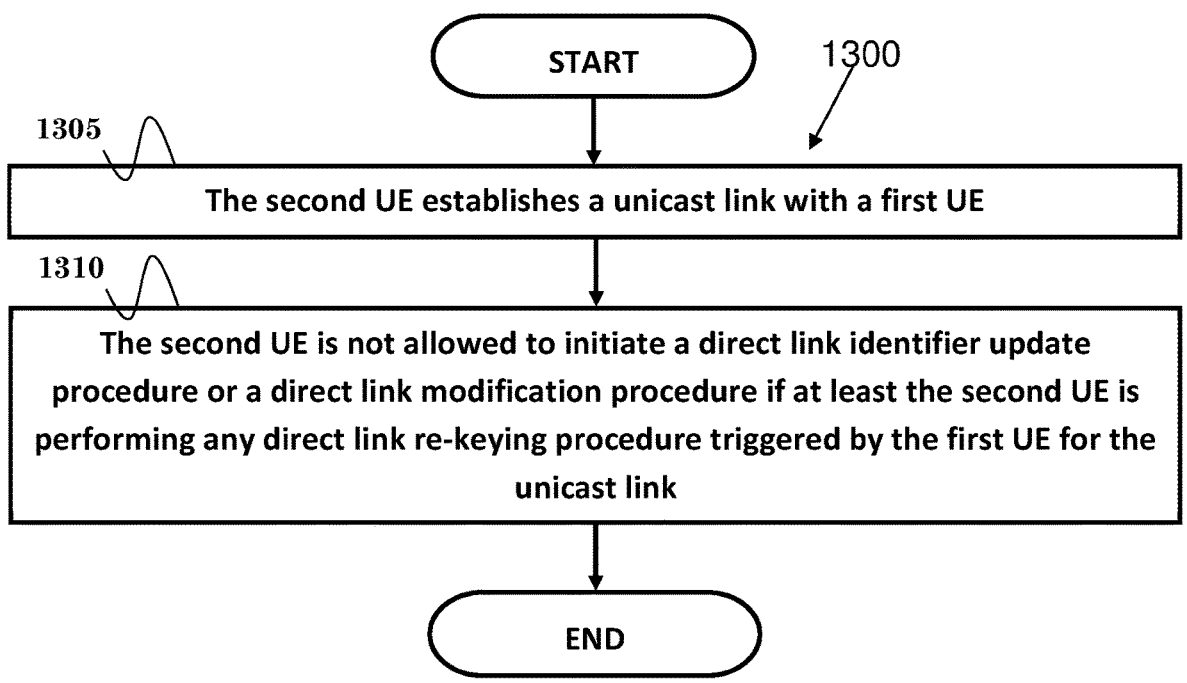
FIG. 13 is a flow chart according to one exemplary embodiment.

The solution could be illustrated in following example of text proposal for 3GPP TS 24.554:

FIG. 13 is a flow chart 1300 of a method for a second UE. In step 1305, the second UE establishes a unicast link with a first UE. In step 1310, the second UE is not allowed to initiate a direct link identifier update procedure or a direct link modification procedure if at least the second UE is performing any direct link re-keying procedure triggered by the first UE for the unicast link.

In one embodiment, the second UE may not be allowed to initiate the direct link identifier update procedure or the direct link modification procedure if at least a specific timer for the unicast link is running on the second UE. The specific timer for the unicast link may be T5091.

In one embodiment, the second UE may be aware of a need for initiating the direct link identifier update procedure or the direct link modification procedure with the first UE for the unicast link. The need for initiating the direct link identifier update procedure could mean the second UE changes application layer identifier (ID) or a privacy timer of the second UE's layer-2 ID expires. The need for initiating the direct link modification procedure could also mean the second UE adds, modifies or removes at least one of a PC5 Quality of Service (QoS) flow and a Proximity-based services (ProSe)application/service for the unicast link.

In one embodiment, the direct link re-keying procedure may be used for updating security context of the unicast link.

In one embodiment, the second UE may not be allowed to initiate the direct link identifier update procedure or the direct link modification procedure means that the second UE is prohibited to initiate the direct link identifier update procedure or the direct link modification procedure.

Referring back to FIGS. 3 and 4, in one exemplary from the perspective of a second UE, the second UE 300 includes a program code 312 stored in the memory 310. The CPU 308 could execute program code 312 to enable the second UE (i) to establish a unicast link with a first UE, and (ii) to not be allowed to initiate a direct link identifier update procedure or a direct link modification procedure if at least the second UE is performing any direct link re-keying procedure triggered by the first UE for the unicast link. Furthermore, the CPU

---

7.2.4.2 5G ProSe direct link identifier update procedure initiation by initiating UE The initiating UE shall initiate the procedure if:
a) the initiating UE receives a request from upper layers to change the application layer ID and there is an existing 5G ProSe direct link associated with this application layer ID; or
b) the privacy timer (see clause 5.2.4) of the initiating UE's layer-2 ID expires for an existing 5G ProSe direct link.
 The initiating UE shall meet the following pre-conditions before initiating this procedure:
a) the initiating UE is not performing the 5G ProSe direct link re-keying procedure triggered by the target UE.
 [. . .]

---

It is noted that one or more solutions could be illustrated in following exemplary text proposal for 3GPP TS 24.554:

---

7.2.4.2 5G ProSe direct link identifier update procedure initiation by initiating UE The initiating UE shall initiate the procedure if:
a) the initiating UE receives a request from upper layers to change the application layer ID and there is an existing 5G ProSe direct link associated with this application layer ID; or
b) the privacy timer (see clause 5.2.4) of the initiating UE's layer-2 ID expires for an existing 5G ProSe direct link.
 The initiating UE shall meet the following pre-conditions before initiating this procedure:
a) the timer T5091 is not running; and
b) the initiating UE is not performing the 5G ProSe direct link re-keying procedure triggered by the target UE.
 [. . .]

308 can execute the program code 312 to perform all of the above-described actions and steps or others described herein.

Figure 14:
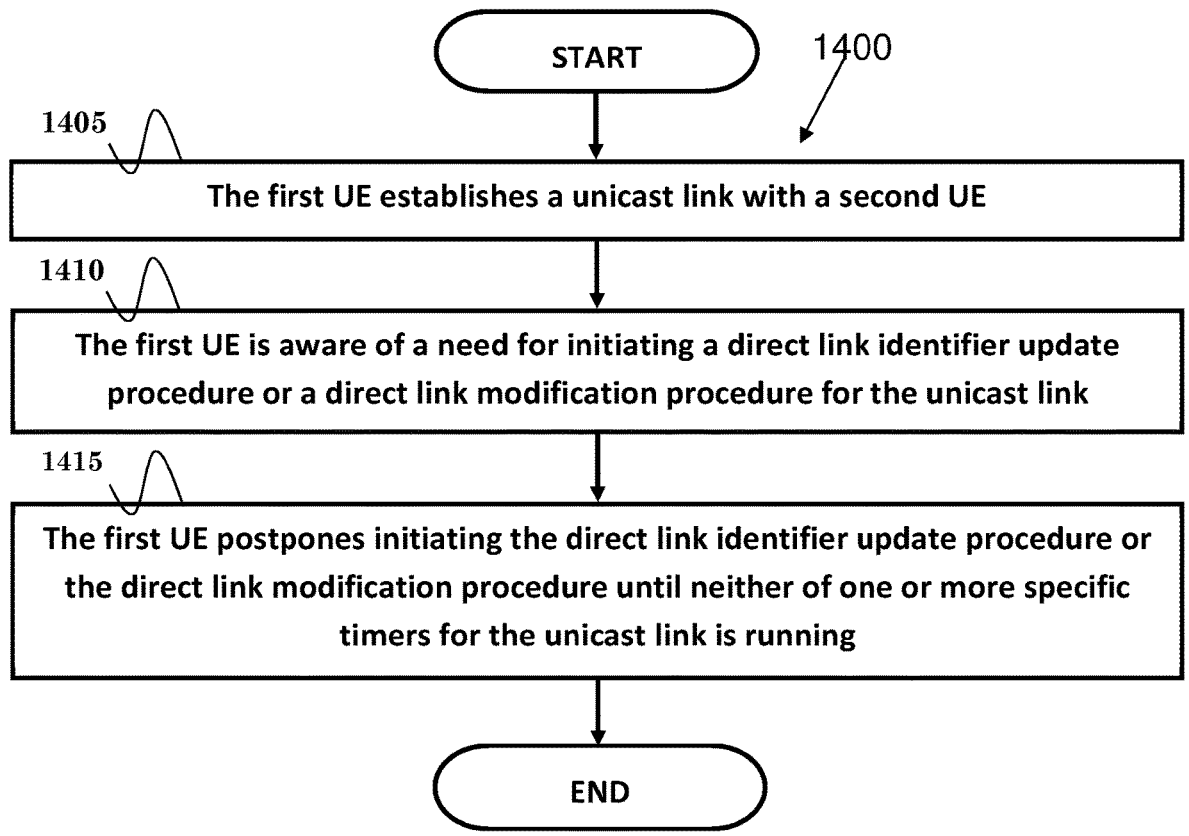
FIG. 14 is a flow chart according to one exemplary embodiment.

FIG. 14 is a flow chart 1400 of a method for a first UE. In step 1405, the first UE establishes a unicast link with a second UE. In step 1410, the first UE is aware of a need for initiating a direct link identifier update procedure or a direct link modification procedure for the unicast link. In step 1415, the first UE postpones initiating the direct link identifier update procedure or the direct link modification procedure until neither of one or more specific timers for the unicast link is running.

In one embodiment, postpone initiating the direct link identifier update procedure or the direct link modification procedure could mean that the first UE sends no direct link identifier update request message in the direct link identifier update procedure or sends no direct link modification request message in the direct link modification procedure to the second UE. Postpone initiating the direct link identifier update procedure or the direct link modification procedure could also mean that the first UE does not send any direct link identifier update request message in the direct link identifier update procedure or does not send any direct link modification request message in the direct link modification procedure to the second UE. In one embodiment, the one or more specific timers contains at least T5091.

In one embodiment, the need for initiating the direct link identifier update procedure could mean the first UE changes application layer ID or a privacy timer of the first UE's layer-2 ID expires. The need for initiating the direct link modification procedure could also mean the first UE adds, modifies or releases/removes a PC5 QoS flow or a ProSe application/service for the unicast link.

Referring back to FIGS. 3 and 4, in one exemplary from the perspective of a first UE, the first UE 300 includes a program code 312 stored in the memory 310. The CPU 308 could execute program code 312 to enable the first UE (i) to establish a unicast link with a second UE, (ii) to be aware of a need for initiating a direct link identifier update procedure or a direct link modification procedure for the unicast link, and (iii) to postpone initiating the direct link identifier update procedure or the direct link modification procedure until neither of one or more specific timers for the unicast link is running. Furthermore, the CPU 308 can execute the program code 312 to perform all of the above-described actions and steps or others described herein.

Figure 15:
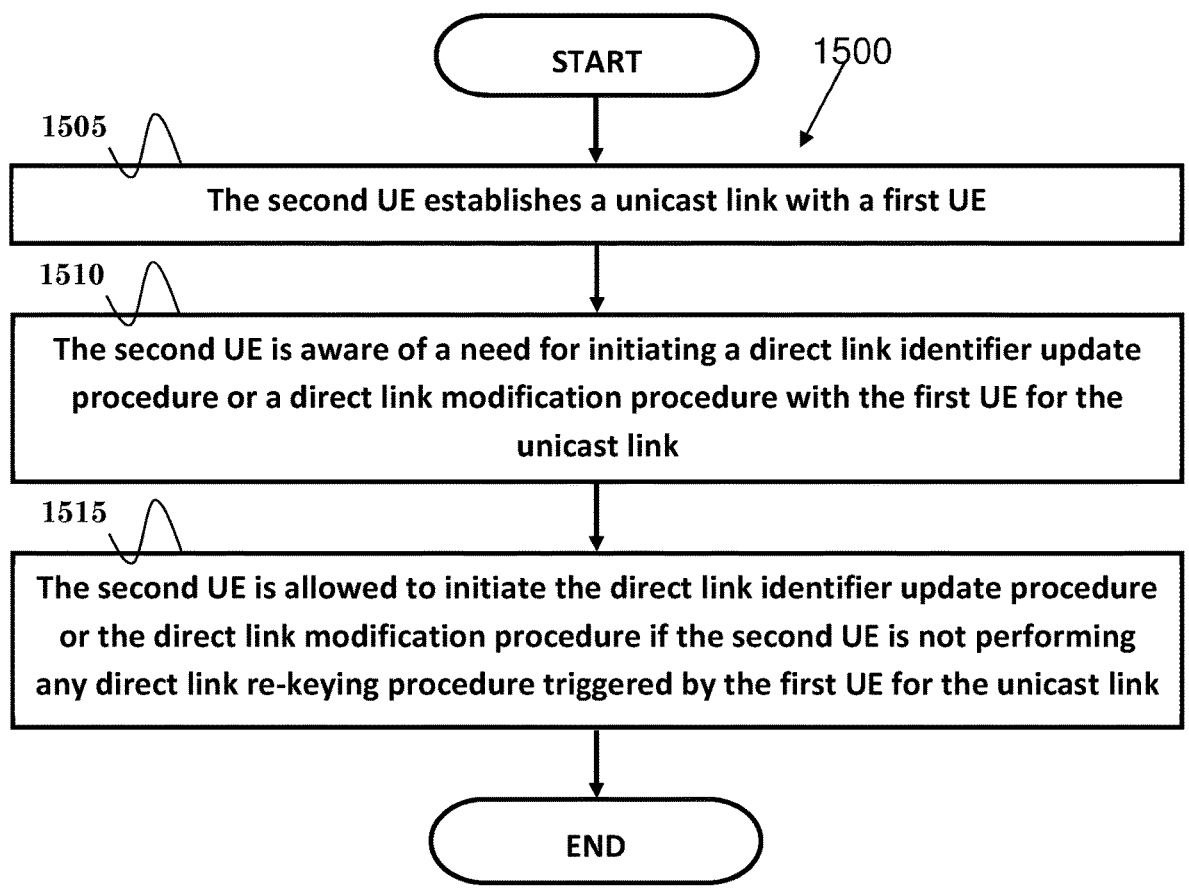
FIG. 15 is a flow chart according to one exemplary embodiment.

FIG. 15 is a flow chart 1500 of a method for a second UE. In step 1505, the second UE establishes a unicast link with a first UE. In step 1510, the second UE is aware of a need for initiating a direct link identifier update procedure or a direct link modification procedure with the first UE for the unicast link. In step 1515, the second UE is allowed to initiate the direct link identifier update procedure or the direct link modification procedure if the second UE is not performing any direct link re-keying procedure triggered by the first UE for the unicast link.

In one embodiment, the second UE could postpone initiating the direct link identifier update procedure or the direct link modification procedure if the second UE is performing a direct link re-keying procedure triggered by the first UE for the unicast link. The second UE could receive a direct link re-keying request message of the direct link re-keying procedure from the first UE. The second UE could initiate the direct link identifier update procedure or the direct link modification procedure after the second UE sends a direct link re-keying response message corresponding to the direct link re-keying request message to the first UE.

In one embodiment, the second UE may not send any direct link identifier update request message in the direct link identifier update procedure or does not send any direct link modification request message in the direct link modification procedure to the first UE before sending the direct link re-keying response message.

In one embodiment, the need for initiating the direct link identifier update procedure could mean the second UE changes application layer ID or a privacy timer of the second UE's layer-2 ID expires. The need for initiating the direct link modification procedure could also mean the second UE adds, modifies or releases/removes a PC5 QoS flow or a ProSe application/service for the unicast link.

Referring back to FIGS. 3 and 4, in one exemplary from the perspective of a second UE, the second UE 300 includes a program code 312 stored in the memory 310. The CPU 308 could execute program code 312 to enable the second UE (i) to establish a unicast link with a first UE, (ii) to be aware of a need for initiating a direct link identifier update procedure or a direct link modification procedure with the first UE for the unicast link, and (iii) to be allowed to initiate the direct link identifier update procedure or the direct link modification procedure if the second UE is not performing any direct link re-keying procedure triggered by the first UE for the unicast link. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a second User Equipment (UE), comprising:
   establishing a unicast link with a first UE; and
   not allowing the second UE to initiate a direct link identifier update procedure or a direct link modification procedure when the second UE is performing a direct link re-keying procedure triggered by the first UE for the unicast link established between the first UE and the second UE.

2. The method of claim 1, wherein the second UE is not allowed to initiate the direct link identifier update procedure or the direct link modification procedure if at least a specific timer for the unicast link is running on the second UE.

3. The method of claim 2, wherein the specific timer for the unicast link is T5091.

4. The method of claim 1, wherein the second UE is aware of a need for initiating the direct link identifier update procedure or the direct link modification procedure with the first UE for the unicast link.

5. The method of claim 4, wherein the need for initiating the direct link identifier update procedure means the second UE changes application layer identifier (ID) or a privacy timer of the second UE's layer-2 ID expires.

6. The method of claim 4, wherein the need for initiating the direct link modification procedure means the second UE adds, modifies or removes at least one of a PC5 Quality of Service (QoS) flow and a Proximity-based services (ProSe) application/service for the unicast link.

7. The method of claim 1, wherein the direct link re-keying procedure is used for updating security context of the unicast link.

8. The method of claim 1, wherein the second UE is not allowed to initiate the direct link identifier update procedure or the direct link modification procedure means that the second UE is prohibited to initiate the direct link identifier update procedure or the direct link modification procedure.

9. A second User Equipment (UE), comprising:
   a control circuit;
   a processor installed in the control circuit; and
   a memory installed in the control circuit and operatively coupled to the processor;
   wherein the processor is configured to execute a program code stored in the memory to:
      establish a unicast link with a first UE; and
      not allow the second UE to initiate a direct link identifier update procedure or a direct link modification procedure when the second UE is performing a direct link re-keying procedure triggered by the first UE for the unicast link established between the first UE and the second UE.

10. The second UE of claim 9, wherein the second UE is not allowed to initiate the direct link identifier update procedure or the direct link modification procedure if at least a specific timer for the unicast link is running on the second UE.

11. The second UE of claim 10, wherein the specific timer for the unicast link is T5091.

12. The second UE of claim 9, wherein the second UE is aware of a need for initiating the direct link identifier update procedure or the direct link modification procedure with the first UE for the unicast link.

13. The second UE of claim 12, wherein the need for initiating the direct link identifier update procedure means the second UE changes application layer identifier (ID) or a privacy timer of the second UE's layer-2 ID expires.

14. The second UE of claim 12, wherein the need for initiating the direct link modification procedure means the second UE adds, modifies or removes at least one of a PC5 Quality of Service (QoS) flow and a Proximity-based services (ProSe)application/service for the unicast link.

15. The second UE of claim 9, wherein the direct link re-keying procedure is used for updating security context of the unicast link.

16. The second UE of claim 9, wherein the second UE is not allowed to initiate the direct link identifier update procedure or the direct link modification procedure means that the second UE is prohibited to initiate the direct link identifier update procedure or the direct link modification procedure.

17. A second User Equipment (UE), comprising:
a control circuit;
a processor installed in the control circuit; and
a memory installed in the control circuit and operatively coupled to the processor;
wherein the processor is configured to execute a program code stored in the memory to:
establish a unicast link with a first UE;
determine that the second UE is not allowed to initiate a direct link identifier update procedure or a direct link modification procedure when the second UE is performing a direct link re-keying procedure triggered by the first UE for the unicast link established between the first UE and the second UE; and
determine that the second UE is allowed to initiate the direct link identifier update procedure or the direct link modification procedure when the second UE is not performing a direct link re-keying procedure triggered by the first UE for the unicast link established between the first UE and the second UE.

18. The second UE of claim 17, wherein the second UE is not allowed to initiate the direct link identifier update procedure or the direct link modification procedure if at least a specific timer for the unicast link is running on the second UE.

19. The second UE of claim 18, wherein the specific timer for the unicast link is T5091.

20. The second UE of claim 17, wherein the second UE is aware of a need for initiating the direct link identifier update procedure or the direct link modification procedure with the first UE for the unicast link.

* * * * *